United States Patent
Rony et al.

(10) Patent No.: US 11,829,705 B1
(45) Date of Patent: Nov. 28, 2023

(54) FACILITATING GENERATION AND PRESENTATION OF ADVANCED INSIGHTS

(71) Applicant: ADOBE INC., San Jose, CA (US)

(72) Inventors: Md Main Uddin Rony, Washington, DC (US); Fan Du, Milpitas, CA (US); Iftikhar Ahamath Burhanuddin, Bangalore (IN); Ryan Rossi, San Jose, CA (US); Niyati Himanshu Chhaya, Telangana (IN); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/949,903

(22) Filed: Sep. 21, 2022

(51) Int. Cl.
    *G06F 17/00* (2019.01)
    *G06F 40/106* (2020.01)
    *G06F 40/40* (2020.01)

(52) U.S. Cl.
    CPC ............ *G06F 40/106* (2020.01); *G06F 40/40* (2020.01)

(58) Field of Classification Search
    CPC ............................... G06F 40/106; G06F 40/40
    See application file for complete search history.

(56) References Cited

U.S. PATENT DOCUMENTS

| | | | | |
|---|---|---|---|---|
| 10,620,790 | B2* | 4/2020 | Ellis | G06T 11/206 |
| 11,182,748 | B1* | 11/2021 | Neckermann | G06Q 10/109 |
| 2013/0263019 | A1* | 10/2013 | Castellanos | G06Q 50/01 |
| | | | | 715/753 |
| 2014/0282184 | A1* | 9/2014 | Dewan | G06F 3/0484 |
| | | | | 715/771 |
| 2018/0129372 | A1* | 5/2018 | Ellis | G06F 3/0482 |
| 2018/0189691 | A1* | 7/2018 | Oehrle | G06N 7/01 |

(Continued)

FOREIGN PATENT DOCUMENTS

| | | | | |
|---|---|---|---|---|
| CN | 115438210 A | * 12/2022 | | |
| WO | WO-2021231040 A1 | * 11/2021 | | G06F 16/258 |

OTHER PUBLICATIONS

"CRM Analytics", Salesforce Analytics Software and Tools I Tableau CRM—Salesforce.com, Retrieved from Internet URL : https://www.salesforce.com/products/crm-analytics/overview/, accessed on Dec. 7, 2022, pp. 14.

(Continued)

*Primary Examiner* — Laurie A Ries
(74) *Attorney, Agent, or Firm* — Shook, Hardy & Bacon L.L.P.

(57) ABSTRACT

Methods, computer systems, computer-storage media, and graphical user interfaces are provided for facilitating generation and presentation of insights. In one implementation, a set of data is used to generate a data visualization. A candidate insight associated with the data visualization is generated, the candidate insight being generated in text form based on a text template and comprising a descriptive insight, a predictive insight, an investigative, or a prescriptive insight. A set of natural language insights is generated, via a machine learning model. The natural language insights represent the candidate insight in a text style that is different from the text template. A natural language insight having the text style corresponding with a desired text style is selected for presenting the candidate insight and, thereafter, the selected natural language insight and data visualization are providing for display via a graphical user interface.

20 Claims, 12 Drawing Sheets

(56) References Cited

U.S. PATENT DOCUMENTS

| | | | | |
|---|---|---|---|---|
| 2019/0102703 | A1* | 4/2019 | Belyaev | G06F 16/26 |
| 2019/0138912 | A1* | 5/2019 | Modarresi | G06N 5/01 |
| 2020/0034481 | A1* | 1/2020 | Asplund | G06F 16/35 |
| 2020/0065772 | A1* | 2/2020 | Whitehead | G06Q 10/1053 |
| 2020/0134074 | A1* | 4/2020 | Mankovskii | G06F 16/26 |
| 2020/0151217 | A1* | 5/2020 | Kothe | G06F 16/9024 |
| 2020/0293933 | A1* | 9/2020 | Ghosh | G06F 18/10 |
| 2020/0334607 | A1* | 10/2020 | Fadel | G06Q 10/06375 |
| 2020/0349589 | A1* | 11/2020 | Southall | G06Q 10/20 |
| 2020/0387810 | A1* | 12/2020 | Hodgson | G16H 10/40 |
| 2021/0240702 | A1* | 8/2021 | Mei | G06N 20/00 |
| 2022/0358405 | A1* | 11/2022 | Every | G06N 20/00 |
| 2023/0048938 | A1* | 2/2023 | Vertsel | G06F 3/01 |
| 2023/0063424 | A1* | 3/2023 | Zeghlache | G01V 99/005 |

OTHER PUBLICATIONS

"Lexio—Data stories speak louder than dashboards", Lexio | The Future of Data + Analytics, Narrative Science, A Salesforce Company, Retrieved from Internet URL : Wayback Machine—https://web.archive.org/web/20220520130304/https://narrativescience.com/lexio, accessed on Dec. 7, 2022, pp. 11 (2021).

"Natural Language Technology for Every Use Case—Arria NLG", Arria NLG Technology Suite, Retrieved from Internet URL : https://www.arria.com/technology-suite/, accessed on Dec. 7, 2022, pp. 1.

"Visa Chart Components", Visa Developer Center, Retrieved from Internet URL : https://developer.visa.com/pages/chart-components, accessed on Dec. 7, 2022, pp. 9.

"Wordsmith I Automated Insights", Retrieved from Internet URL : https://automatedinsights.com/wordsmith/, accessed on Dec. 7, 2022, pp. 4.

Kim, D. H, et al., "Towards Understanding How Readers Integrate Charts and Captions: A Case Study with Line Charts", In Proceedings of the CHI Conference on Human Factors in Computing Systems, pp. 1-11 (May 8-13, 2021).

Law, P-M., et al., "Characterizing Automated Data Insights", In IEEE Visualization Conference (VIS), arXiv:2008.13060v2, pp. 1-5 (Sep. 4, 2020).

Shi, D., et al., "Calliope: Automatic visual data story generation from a spreadsheet", IEEE Transactions on Visualization and Computer Graphics, arXiv:2010.09975v1, vol. 27, No. 2, pp. 1-11 (Oct. 20, 2020).

* cited by examiner

| Descriptive | Investigative | Predictive | Prescriptive |
|---|---|---|---|
| 'Revenue (in million)' by 'Product' | 'Revenue (in million)' by 'Product' | | |
| *bar chart: T-Shirt, Jacket, Shirt, Pant, Trousers* | *bar chart: T-Shirt, Jacket, Shirt, Pant, Trousers with shaded Bomber portion* | *line chart: Revenue (in thousands) vs Time 9/1/20–9/10/20* | *line chart: Total Revenue and Linen vs Time 9/1/20–9/10/20* |
| The chart shows "Product vs Revenue" for the last month. Jacket has highest revenue. | Jacket has highest revenue in the last month *due to high sale of the "Bomber" edition.* Shaded portion shows the revenue earned from "Bomber". | Sept 5 sees the maximum revenue for Trousers. Since then, revenue is decreasing and *expecting to be lower more in the next few days.* | The revenue for Trousers is decreasing. *Consider replacing Linen type trousers by Fleece type.* |

302 — Descriptive
304 — Investigative
306 — Predictive
308 — Prescriptive

FIG. 3

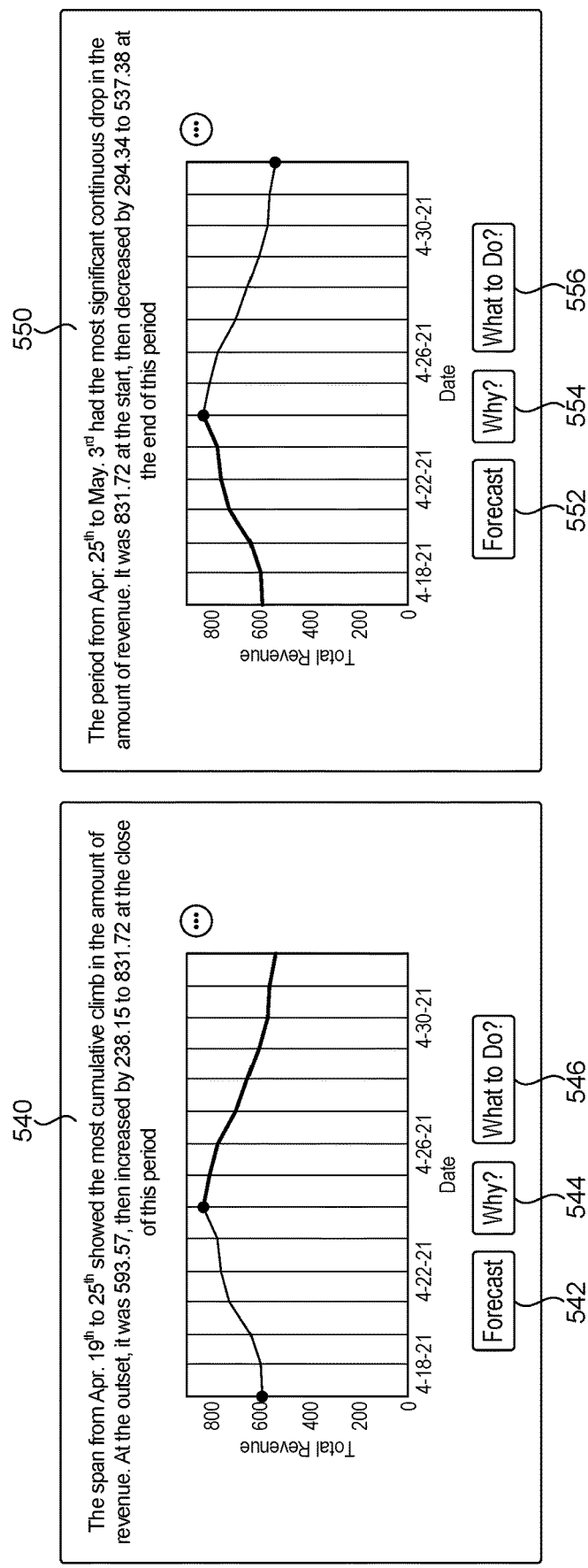

FACILITATING GENERATION AND PRESENTATION OF ADVANCED INSIGHTS

BACKGROUND

Data visualizations provides a powerful way to convey information. In particular, visualizing data in a meaningful or compelling way can be influential and facilitate decisions making. Many existing data analytics and visualization tools are sophisticated. Creating a meaningful, or compelling, data visualization using such visualization tools, however, can be difficult and tedious. For example, many data consumers have limited experience with data science and/or graphical designs making generation of data visualizations difficult. Further, an extensive amount of data and data visualizations can make it time consuming to identify specific data and an appropriate manner in which to present the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating generation and presentation of advanced insights that provide insights beyond simple descriptions of a presented chart or graph. In this regard, embodiments described herein augment data visualizations with advanced insights to facilitate analysis and decision-making. For example, advanced insights can facilitate understanding of the reasons behind various data events (e.g., anomalies), predict future trends, and recommend possible actions for optimizing outcomes. In addition to generating advanced insights, such insights can be enhanced in a textual manner and/or a visual manner to better convey the insight in a manner desired by a user. For example, a style used to convey a text narrative may be adjusted in accordance with user preferences (e.g., user input preferences or preferences automatically identified, for instance, based on prior user interactions) or user attributes (e.g., a business role of the user). Further, a visual annotation(s) can be generated and provided to visually depict the text form of the insight.

BRIEF DESCRIPTION OF THE DRAWINGS

The technology described herein is described in detail below with reference to the attached drawing figures, wherein:

FIG. 3 provides example insights, in accordance with aspects of the technology described herein;

FIGS. 5A-5F provide example user interface experiences related to automated insight generation, in accordance with aspects described herein;

DETAILED DESCRIPTION

Figure 1:
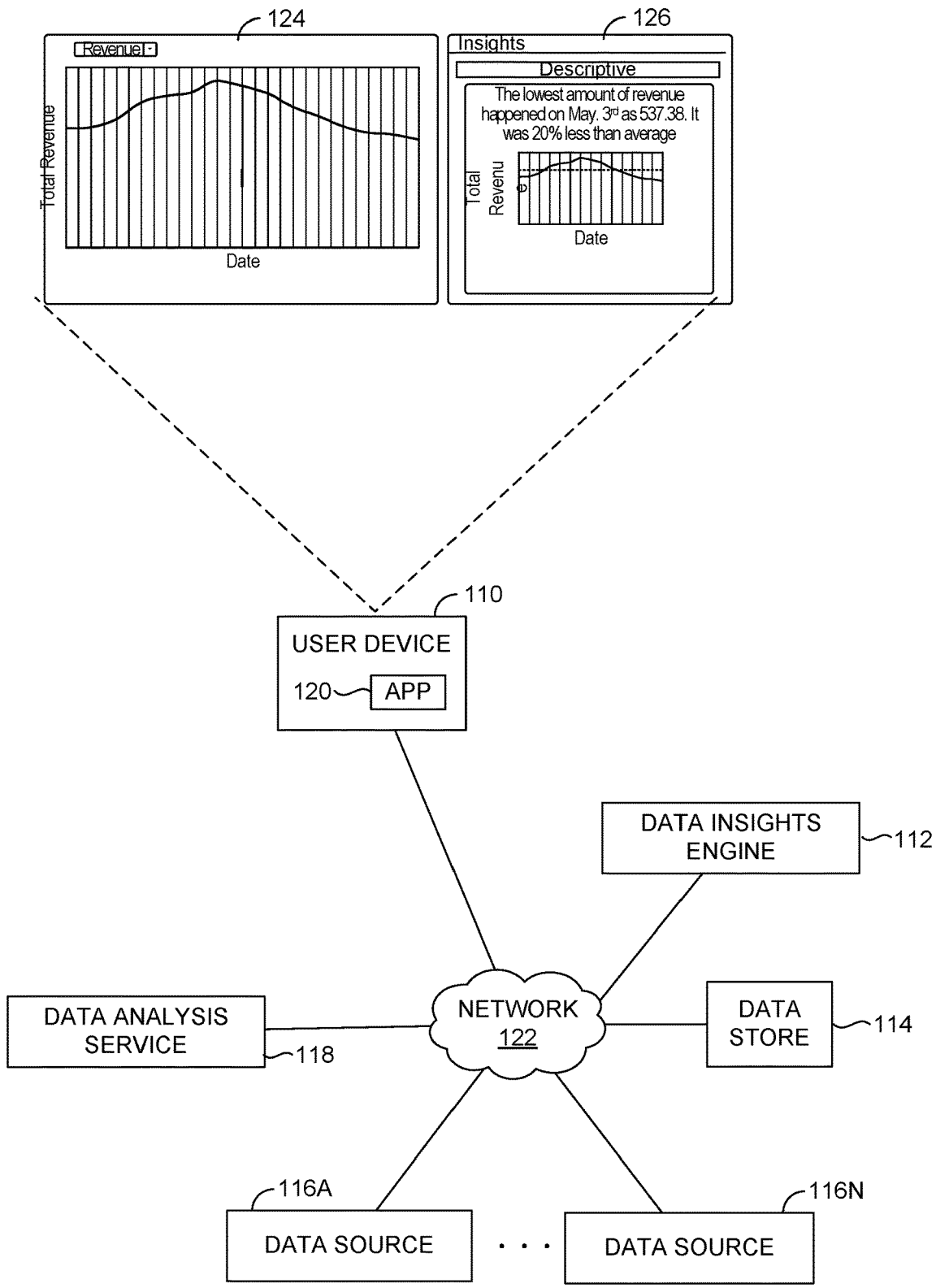
FIG. 1 is a block diagram of an exemplary system for facilitating generation of insights, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

As data is becoming increasingly pervasive and plentiful, many individuals seek to use such data to provide meaningful data visualizations to others. For example, with charts and graphs, data is visually represented to draw a readers' attention to interesting aspects of the data, such as trends and outliers. Oftentimes, however, visualizations can be too complicated to understand. For example, charts and graphs, and in particular complex ones, can be difficult to understand. To facilitate understanding, some technologies present charts with automatically generated narratives to make them easier to understand. In particular, the automatically generated narratives contain facts, or basic statistics, present in the charts to make it easier to read for users. Such narratives generally are simplistic and descriptive narratives such that they explain what is already present and visible in the chart or graph. Simple descriptions, however, can inadequately provide a proper context for understanding the visual graph or chart. In addition, conventional technologies use a template to generate a narrative. As such, the narratives vary very little from one instance to the next, thereby reducing their effectiveness.

Accordingly, embodiments described herein are directed to facilitating generation and presentation of advanced insights that provide insights beyond simple descriptions of a presented chart or graph. In this regard, embodiments described herein augment data visualizations with advanced insights to facilitate analysis and decision-making. For example, advanced insights can facilitate understanding of the reasons behind various data events (e.g., anomalies), predict future trends, and recommend possible actions for optimizing outcomes. In addition to generating advanced insights, in embodiments, such insights can be enhanced in a textual manner and/or a visual manner to better convey the insight in a manner desired by a user. For example, a style used to convey a text narrative may be adjusted in accordance with user preferences (e.g., user input preferences or preferences automatically identified, for instance, based on prior user interactions) or user attributes (e.g., a business role of the user).

In operation, embodiments described herein generate various types of candidate insights corresponding with a data visualization. Such candidate insights include descriptive insights (e.g., cyclic patterns, extremum data, and dramatic change data), predictive insights (e.g., forecasted data), investigative insights (e.g., rationale as to an event), and prescriptive insights (e.g., suggested action to take in light of an event). Candidate insights are often generated in a text format. In accordance with embodiments described herein, the text candidate insights can be enhanced (e.g., via a natural language generation model) in a manner that provides varied text descriptions and also in a manner that conforms to user-desired preferences (e.g., text styles such as formality, conciseness, etc.). In one embodiment, a style-based transfer technique (e.g., using a counterfactual reasoning module) is used to generate new text of different styles (e.g., different formality). Text to present to the user to provide a relevant insight can be selected based on a text style desired by a user. Additionally or alternatively, a visual annotation is generated to visually annotate the insight. For example, an event, such as a dramatic change, can be visually emphasized or annotated via a display screen to illustrate the dramatic change.

Advantageously, using embodiments described herein, generating and presenting advanced insights provides users with information that is not already presented in the visual chart or graph. Not only does providing such information reduce a user's time it would otherwise take to identify or understand the data, computing resource utilization is also reduced as the user's need to manually determine or identify such information is reduced. For example, as opposed to a user searching for data, running analysis on data, and continuing this cycle until the information desired is identified, a user is efficiently presented with insightful information. In some cases, insights are generated in advance to utilize computer resources at desired times (e.g., with reduced usage), thereby improving computer resource efficiency. Further, the data insights presented to a user can be varied in style and dynamically adapt to align with information or preferences of the user. For example, a user can specify preferences in relation to textual presentation and/or visual depiction of insights. As such, a user can view desired information and can assess the information accordingly.

Referring initially to FIG. 1, a block diagram of an exemplary network environment 100 suitable for use in implementing embodiments described herein is shown. Generally, the system 100 illustrates an environment suitable for facilitating generation and presentation of advanced insights in an effective and efficient manner. Among other things, embodiments described herein effectively and efficiently generate advanced insights that are presented in a manner to convey insightful information related to a data visualization. In embodiments, such advanced insights are presented, via a display of a user device, in a textual annotation form and/or a visual annotation form. As described herein, such textual and/or visual annotations can be customized for a particular user viewing the data. A data visualization for which advanced insights are generated generally refers to any visualization of data that can illustrate data. For example, data visualizations may include charts, graphs, etc. Such data visualizations may be used to present a story or visual regarding a topic or metric, among other things. As described herein, advanced insights are generated to characterize, explain, describe, or otherwise provide insightful information pertaining to a data visualization.

The network environment 100 includes a user device 110, a data visualization engine 112, a data store 114, data sources 116a-116n (referred to generally as data source(s) 116), and a data analysis service 118. The user device 110, the data insights engine 112, the data store 114, the data sources 116a-116n, and the data analysis service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110 and data sources 116a-116n may be in communication with the data insights engine 112 via a mobile network or the Internet, and the data insights engine 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the data insights engine 112 and/or data store 114 may be integrated with the user device 110 and/or data analysis service 118. For instance, a portion of the data insights engine 112 may be integrated with a server (e.g., data analysis service) in communication with a user device, while another portion of the data insights engine 112 may be integrated with the user device (e.g., via application 120).

The user device 110 can be any kind of computing device capable of facilitating generation and/or presentation of advanced insights. For example, in an embodiment, the user device 110 can be a computing device such as computing device 900, as described above with reference to FIG. 9. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating generation and/or presentation of advanced insights. In some implementations, the application(s) comprises a web application, which can run in a web browser, and could be hosted at least partially server-side (e.g., via data insights engine 112 or data analysis service 118). In addition, or instead, the application(s) can comprise a dedicated application. In some cases, the application is integrated into the operating system (e.g., as a service). As one specific example application, application 120 may be a visual design tool or other data analysis tool that provides various data and data visualizations. Such an application may be accessed via a mobile application, a web application, or the like.

User device 110 can be a client device on a client-side of operating environment 100, while data insights engine 112 and/or data analysis service 118 can be on a server-side of operating environment 100. Data insights engine 112 and/or data analysis service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, data insights engine 112, and/or data analysis service 118 to remain as separate entities.

In an embodiment, the user device 110 is separate and distinct from the data insights engine 112, the data store 114, the data sources 116, and the data analysis service 118 illustrated in FIG. 1. In another embodiment, the user device 110 is integrated with one or more illustrated components. For instance, the user device 110 may incorporate functionality described in relation to the data insights engine 112. For clarity of explanation, embodiments are described herein in which the user device 110, the data insights engine 112, the data store 114, the data sources 116, and the data analysis service 118 are separate, while understanding that this may not be the case in various configurations contemplated.

As described, a user device, such as user device 110, can facilitate generation and/or presentation of insights, such as advanced insights. Insights, or advanced insights, are broadly used herein and may refer to any insights in the form of text and/or visual depictions associated with a dataset(s) and/or data visualization.

A user device 110, as described herein, is generally operated by an individual or entity interested in viewing visualizations of data (e.g., in the form of graphs, charts, etc.) and/or insights (e.g., advanced insights in the form of text or visual depictions). As can be appreciated, a user interested in viewing data visualizations need not be an individual or entity associated with capturing or providing a dataset from which the data visualizations or insights are generated. For example, in some cases, a user desiring to view data visualizations may be an individual gathering insights of data (e.g., trends) provided by another entity (e.g., in a collaborative environment or obtained via the Internet).

In some cases, automated advanced insight generation and/or presentation to augment a visualization may be initiated at the user device 110. For example, a user may select to view a data visualization. In such a case, insights may be automatically generated and/or presented in accordance with presenting the selected visualization. As described herein, in some cases, the insights may have been previously generated, for example, pre-generated to utilize computer resources at desired times (e.g., with reduced usage). In such a case, user selection to view a data visualization may prompt or initiate the display of such a data visualization as well as insights associated therewith. Alternatively or additionally to initiating insight generation and/or presentation via a user device, in some cases, insight generation may be initiated automatically. For example, based on a lapse of a predetermined period (e.g., 1 hour, 1 day), insights may be automatically generated. As another example, based on a reduction of computing resources (e.g., overnight), insight generation may be automatically triggered. As yet another example, based on receiving or obtaining new data, or a threshold amount of data, insight generation may be initiated.

Irrespective of whether insights are generated in advance or at presentation time, a user may provide, via a graphical user interface, various aspects for use in generating and/or displaying data visualizations and/or corresponding insights. Various aspects a user may indicate as desired include, for example, dataset attributes and annotation attributes. Dataset attributes refer to attributes related to the data. Dataset attributes may indicate types of data to use to generate data visualizations and/or to generate insights. Examples of such attributes may be metric attributes, dimension attributes, and/or time attributes. A metric attribute may include, for example, revenue, purchases, visits, visitors, visit from web, visit from mobile, etc. A dimension attribute may include, for instance, a product, a location, a category, gender, sub-category. A time attribute may indicate a time frame, such as a last week, a last month, a month, a year, etc. Such attributes may be used alone or in combination to facilitate aspects associated with a data visualization to generate/present and/or insights to generate/present. Annotation attributes refer to attributes related to preferences for presenting textual and/or visualization annotations of insights. Insight attributes refer to attributes related to insights. Examples of annotation attributes include indications of a text style for a textual annotation (e.g., a formal text style, an information text style, a causal text style, a concise text style, etc.). Attributes may be input by a user in any number of ways via a user interface. For example, a user may input attributes using natural language, via selection from itemized lists (e.g., via a drop down list), using a sliding scale, etc.

As can be appreciated, in some cases, a user of the user device 110 that may initiate generation and/or presentation of data visualizations and/or insights is a user that can view the data. In additional or alternative cases, an administrator, programmer, or other individual associated with an organization may initiate such generation or presentation of data, but not necessarily be a consumer or viewer of the data visualization or insights.

A selection or input to view a data visualization(s), insight(s), and/or provide attributes may be performed via an application 120 operating on the user device 110. In this regard, the user device 110, via an application 120, might allow a user to input, select, or otherwise provide an indication to view a data visualization, an indication to generate and/or view an insight, and/or an indication of one or more attributes to use in generating and/or presenting a data visualization and/or insight. Additionally or alternatively, and in accordance with embodiments described herein, a user may interact with one or more insights to view additional data or insights. For example, in association with providing one type of insight, a user may select to view another type of insight associated therewith. The application 120 may facilitate inputting of such information in a verbal form of communication or a textual form of communication. The user device 110 can include any type of application and may be a stand-alone application, a mobile application, a web application, or the like. In some cases, the functionality described herein may be integrated directly with an application or may be an add-on, or plug-in, to an application.

The user device 110 can communicate with the data insights engine 112 to provide input (e.g., dataset attributes, annotation attributes, etc.), initiate generation of data visualizations and/or insights, and obtain data visualizations and/or insights. In embodiments, for example, a user may utilize the user device 110 to initiate a generation of a data visualization and corresponding insights via the network 122. For instance, in some embodiments, the network 122 might be the Internet, and the user device 110 interacts with the data insights engine 112 (e.g., directly or via data analysis service 118) to initiate generation and/or presentation of a data visualization and/or corresponding insights. In other embodiments, for example, the network 122 might be an enterprise network associated with an organization. It should be apparent to those having skill in the relevant arts that any number of other implementation scenarios may be possible as well.

With continued reference to FIG. 1, the data insights engine 112 can be implemented as server systems, program modules, virtual machines, components of a server or servers, networks, and the like. At a high level, the data insights engine 112 manages data insight generation and/or presentation. In some embodiments, the data insights engine 112 may also generate the data visualization to which the insights correspond, or such data visualization may be generated by another component. In operation, the data insights engine 112 can obtain attributes, from user devices 110, and insight data, such as insight data from data sources 116. Data sources 116a-116n may be any type of source providing data (e.g., insight data). Generally, the data insights engine 112 can receive data from any number of devices. As such, the data insights engine 112 can identify and/or collect data from various user devices, such as user device 110, and sources, such as data sources 116a-116n. In this regard, the data insights engine 112 can retrieve or receive data collected or identified at various components, or sensors associated therewith.

As described, in some cases, the data insights engine 112 can receive attributes, such as dataset attributes and/or annotation attributes, for generating data insights via the user device 110 (or other device). Attributes received from a device, such as user device 110, can include various dataset attributes (e.g., metrics, dimensions, time frames, etc.) and/or annotation attributes manually or explicitly input by the user (input queries or selections). As described, annotation attributes generally refer to preferences related to presentation of insights. For example, for a text annotation, an annotation preference may indicate whether a user prefers to view a more formal text annotation or a causal text annotation. Various types of annotation attributes may be provided in relation to text annotations and visual depiction annotations. Generally, the data insights engine 112 can receive dataset attributes and/or annotation attributes from any number of devices. In accordance with receiving attributes and/or annotation attributes (e.g., via the user device 110), or otherwise receiving an indication to generate data insights, the data insight engine 112 can access and utilize insight data to generate a data insight(s). As described, in various embodiments, a user-provided attribute(s) (e.g., dataset attribute and/or annotation attribute) is not required. For example, default attributes (e.g., a default or identified dataset attribute or default or identified annotation attribute) can be used to generate a data insight(s).

In accordance with initiating generation of a data insights (e.g., via receiving a request or input to generate data insights, receiving attributes, etc.), the data insights engine 112 can use insight data to generate a data insight(s). Insight data generally refers to any data that can be used to generate a data insight(s). By way of example only, insight data may include consumer data from which a data visualization is generated (for which insights are generated). Consumer data can include any type of data, such as business data. The dataset may be refined, for example, in accordance with dataset attributes, for example provided by a user. For instance, in cases that a user specifies a metric, dimension, and/or time frame, the insight dataset used for generating data insights may correspond with such specified metrics, dimensions, and/or time frame. Consumer data used for generating a data insight can be any type of data. By way of example and not limitation, consumer data within a dataset may include data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, sports data, health data, and nearly any other source of data that may be used to generate data insights, as described herein.

Such consumer data can be initially collected at remote locations or systems and transmitted to data store 114 for access by data insights engine 112. In accordance with embodiments described herein, consumer data collection may occur at data sources 116. In some cases, data sources 116, or portion thereof, may be client devices, that is, computing devices operated by data consumers (e.g., online viewers, online product consumers, etc.), for example. As such, client devices, or components associated therewith, can be used to collect various types of consumer data. For example, in some embodiments, consumer data may be obtained and collected at a client device operated by a consumer via one or more sensors, which may be on or associated with one or more client devices and/or other computing devices. As used herein, a sensor may include a function, routine, component, or combination thereof for sensing, detecting, or otherwise obtaining information, such as consumer data, and may be embodied as hardware, software, or both.

In addition or in the alternative to data sources 116 including client devices, data sources 116 may include servers, data stores, or other components that collect consumer data, for example, from client devices associated with consumers. For example, in interacting with a client device, datasets may be captured at data sources 116 and, thereafter, such consumer data can be provided to the data store 114 and/or data insight engine 112. In this regard, dataset contributors may operate a client device and provide a dataset to the data source 116. Although generally discussed as consumer data provided to the data store 114 and/or data insight engine 112 via data sources 116 (e.g., a client device or server, data store, or other component in communication with user device), consumer data may additionally or alternatively be obtained at and provided from the data analysis service 118, or other external server, for example, that collects consumer data. Consumer data can be obtained at a data source periodically or in an ongoing manner (or at any time) and provided to the data store 114 and/or data insights engine 112 to facilitate generation of data insights.

Similarly, other types of insight data may be obtained and used to generate data insights. Other types of insight data include consumer profile data and user interaction data. Consumer profile data generally refers to profile data associated with a consumer(s) corresponding with consumer data. Consumer profile data may indicate, for example, various demographics of a consumer. Such consumer profile data may facilitate generating various insights (e.g., to identify reasons underlying anomalies). User interaction data generally refers to data indicating various user interactions with data visualizations and/or corresponding insights. For example, user interaction data may indicate frequency of which a user selects to view a particular type of data visualization, extent of which a user selects to view formal text annotations relative to causal text annotations, etc. Such interaction data may facilitate generating and/or presenting various insights (e.g., a preference to generate a visual depiction or a preference to generate a formal text annotation, etc.).

In accordance with embodiments described herein, and as more fully described below with reference to FIG. 2, the data insights engine 112 analyzes insight data (e.g., consumer data) to identify various types of insights. In this regard, the data insights engine 112 can identify candidate descriptive insights, predictive insights, investigative insights, and/or prescriptive insights. Such advanced insights facilitate understanding of the data underlying or presented in a data visualization. In this way, a viewer of a data visualization can gain insight that is not readily identifiable via viewing the data visualization. Any number of the candidate insights can be provided as data insights for presentation to a user, via a user device. For example, in some cases, each identified candidate insight may be provided for presentation (e.g., either direct presentation or indirect presentation, for instance, based on a user selection to view one or more insights). In other cases, a candidate insight(s) to provide for presentation may be determined or selected via the data insights engine 112, for instance, based on a ranking, relevance, score, etc. In some cases, the data insights engine 112 can enhance or transform the initial candidate insights via enhanced text annotations and/or visual depiction annotations. In embodiments, annotation attributes (e.g., input by a user) may be used to generate annotations, thereby to generate annotations in accordance with a user's viewing desires.

In some cases, data insights are provided to the user device 110 for display to the user. In other cases, the data analysis service 118 may use such data to perform further analysis and/or render or provide data insights to the user device 110. For example, in some embodiments, the data analysis service 118 can reference a data insight (e.g., generated via data insights engine 112) and a data visualization (e.g., generated via data insights engine 112 or another engine/server) and aggregate such data to provide to the user device 110. The data analysis service 118 may be any type of server or service that can analyze data, render data, and/or provide information to user devices. Although data analysis service 118 is shown separate from the data insights engine 112, as can be appreciated, the data insights engine can be integrated with the data analysis service 118, or other service or service. The user device 110 can present received data or information in any number of ways, and is not intended to be limited herein. As an example, a data visualization 124 and corresponding data insight 126 can be presented via application 120 of the user device.

Advantageously, utilizing implementations described herein enable advanced data insights to be generated and presented in an efficient and effective manner. In this way, a user viewing a data visualization is provided with insightful information that is not readily apparent by viewing the data visualization. Further, the data insights can dynamically adapt to align with information or preferences of the user. For example, a user can specify preferences in relation to textual presentation and/or visual depiction of insights. As such, a user can view desired information and can assess the information accordingly.

Figure 2:
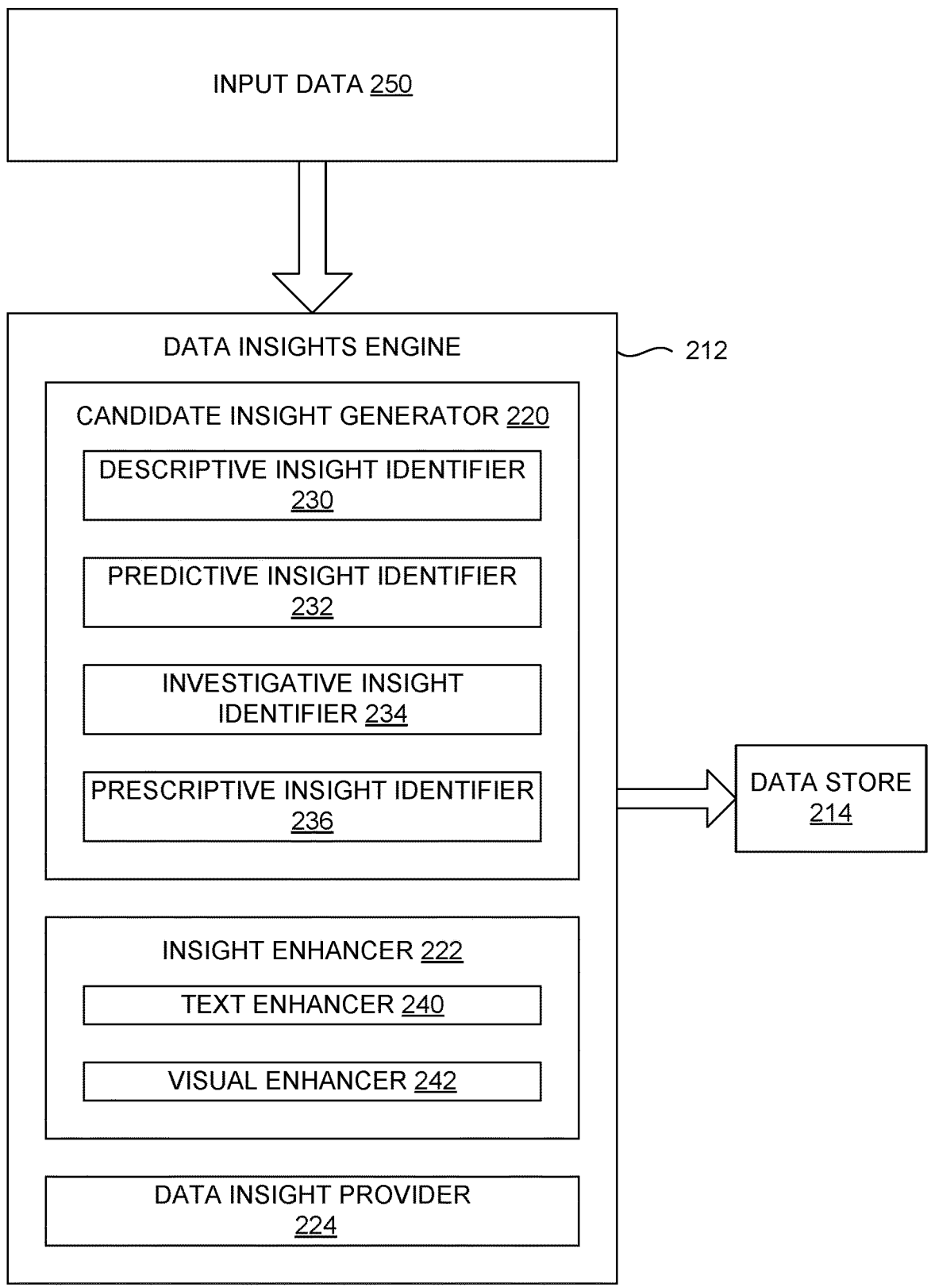
FIG. 2 is an example an example implementation for facilitating generation of insights, via a data insights engine, in accordance with aspects of the technology described herein.

Turning now to FIG. 2, FIG. 2 illustrates an example implementation for facilitating data insights generation and/or presentation, via data insights engine 212. The data insights engine 212 can communicate with the data store 214. The data store 214 is configured to store various types of information accessible by the data insights engine 212, or other server or component. In embodiments, data sources (such as data sources 116 of FIG. 1), user devices (such as user device 110 of FIG. 1), data insights engine 212 can provide data to the data store 214 for storage, which may be retrieved or referenced by any such component. As such, the data store 214 may store insight data (e.g., consumer data, consumer profile data, user interaction data), dataset attributes (e.g., metrics, dimensions, time restrictions), annotation attributes (formality preference, etc.), and/or the like.

In operation, the data insights engine 212 is generally configured to manage generation and/or presentation of data insight(s). In embodiments, the data insights engine 212 includes a candidate insight generator 220, an insight enhancer 222, and a data insight provider 224. According to embodiments described herein, the data insights engine 212 can include any number of other components not illustrated. In some embodiments, one or more of the illustrated components 220, 222, and 224 can be integrated into a single component or can be divided into a number of different components. Components 220, 222, and 224 can be implemented on any number of machines and can be integrated, as desired, with any number of other functionalities or services.

In some cases, the data insights engine 212 may be initiated or triggered to generate and/or present data insights upon obtaining input data 250. Input data may be any type of data indicating a desire to generate and/or present data insights or a data visualization associated therewith. As one example, input data 250 may include an indication, request, or command received from a user device based on a user selection to view a data visualization. In accordance with preparing a data visualization to present to the user, the data insights engine 212 can be initiated to generate data insights. As another example, input data 250 may include an indication, request, or command received from a user device based on a user selection to view one or more data insights related to a data visualization. For instance, in accordance with viewing a data visualization via a user device, a user may select to view data insights or a type of data insight associated therewith, or a user may select to view a different type of data insight than initially or currently presented. As yet another example, input data 250 may additionally or alternatively include one or more dataset attributes (e.g., indicating aspects of data for use in generating the insights) and/or one or more annotation attributes (e.g., indicating aspects of how to textually or visually enhance an insight to be presented). In other cases, such attributes may be accessed from data store 214, for example, upon initiating generation of data insights. Although one example for initiating generation of insights corresponds with obtaining input in association with a user operating at a user device, other implementations are contemplated. For example, as described, data insight generation may be initiated based on a lapse of a time period, a particular time of day, a decrease in computing resource usage, obtaining new data or a particular amount of new data, etc.

The candidate insight generator 220 is generally configured to generate candidate data insights. A candidate insight generally refers to any insight that is a potential data insight to be presented in relation to a data visualization. In this regard, the candidate insight generator 220 can access or reference insight data for use in generating candidate insights. Insight data may be stored, for example, in data store 214. As described with reference to FIG. 1, the insight data may be obtained from any number or type of data sources including client devices, servers, etc. Insight data may be consumer data, consumer profile data, and/or user interaction data. Consumer data refers to data being analyzed to generate the data visualization and/or data insight. Consumer data may be any type of data. In embodiments, consumer data may include interactions with a website, conversions, advertisement clicks, web visitor data, or other data relevant to a website, application, product, etc. As described herein, consumer data may be defined by one or more dataset attributes provided by a user. For example, a user desiring to view a data visualization and/or corresponding insights may specify a metric(s) (e.g., revenue, purchases, visits, visitors, visit from web, visit from mobile, etc.), a dimension(s) (e.g., product, location, category, gender, sub-category, etc.), and/or a time frame (e.g., one week, last week, one month, etc.). Based on such attributes, the data may be defined or selected for generating data insights.

Candidate insight generator 220 may additionally or alternatively use consumer profile data and/or user interaction data. Consumer profile data generally refers to data associated with the individual or individual device associated with the consumer data. User interaction data generally refers to data associated with interactions of user of the data visualization/insights.

As described, such insight data used to generate candidate insights may be referenced or obtained, for example, via data store 214 based on input data 250 (e.g., dataset attributes) or other otherwise. Upon obtaining insight data, the candidate insight generator 220 generally generates one or more candidate insights. Various types of candidate insights may be generated. By way of example, and without limitation, various types of candidate insights generated include descriptive insights, predictive insights, investigative insights, and prescriptive insights. With reference to FIG. 3, various insight examples are provided. For example, descriptive insight 302 describes information presented in the data visualization. Investigative insight 304 provides a reason or rational for why the jacket has the highest revenue as indicated in the descriptive insight 302. The predictive insight 306 provides predicted or forecasted data. The prescriptive insight 308 provides a suggestion action to take to address decreasing revenue. Such insights 302-308 are only provided for illustrative purposes and are not intended to limit embodiments described herein.

As shown in FIG. 2, a descriptive insight identifier 230, a predictive insight identifier 232, an investigative insight identifier 234, and a prescriptive insight identifier 236 are used to generate the corresponding types of candidate insights, as described in more detail below. The descriptive insight identifier 230 is generally configured to identify descriptive insights. A descriptive insight generally refers to an insight related to facts or details presented in association with a data visualization (e.g. presented concurrently on the display screen). For example, a candidate descriptive insight may report a fact(s) related to a metric present in a displayed data visualization, such as mean, minimum value, maximum value, average value, etc. By way of example only, in association with a graph presenting revenue over time, a candidate descriptive insight may indicate a lowest revenue for a particular time period, a highest revenue for a particular time period, an average revenue over a time period, etc. Other candidate descriptive insight may be identified in association with the identified revenue (e.g., lowest revenue), etc. For example, a descriptive insight that may be presented may be "The lowest amount of revenue happened in May 3rd as 537.38. It was 20% less than average." This descriptive insight describes the lowest revenue for a particular period and also outlines the average trend.

In embodiments, the descriptive insight identifier 230 also identifies more advanced descriptive insights, such as patterns and anomalies. By way of example only, the descriptive insight identifier 230 can identify cyclic patterns, dramatic changes, and extremum data (minimum, maximum).

A cyclic pattern generally refers to a pattern associated with a series of data that repetitively occurs (e.g., in a same order). In one embodiment, to identify cyclic patterns, the descriptive insight identifier 230 can apply a statistical test to a range of dates to identify notable cyclical patterns. Autocorrelation can be used to find correlation in time series. In embodiments, time series data is shifted by a different offset and the shifted time series is used (e.g., compared to itself) to determine whether a pattern exists (e.g., a 7 day pattern, 3 day pattern, etc.). A time window can then be used to test against it to tell user if you have a 7 day cycle pattern, etc. In embodiments, an auto correlation, ac, is calculated between a series of data, $D_s$, and a delayed copy over a particular window interval of time, w. In this regard, an auto correlation function is defined as:

$$acf = \text{autocorrelation}(d_s, w)$$

In one implementation, a cyclic pattern is considered statistically significant if the auto correlation function, ac $f$, is higher or greater than a predefined or threshold, $t_f$, (user-defined threshold).

Extremum data generally refers a highest and/or lowest value for a given dataset. As one example, the descriptive insight generator 230 can identify an index, i, for a given dataset, $d_s$, where $d_{a \in [1,n]} = \{t_a, v_a\}$, includes a time unit, $t_a$, and a metric value, $v_a$, where $v_i = \max(v_1 \ldots v_n)$ or $v_i = \min(v_i \ldots v_n)$. In some embodiments, if there is a maximum or minimum on multiple indexes, a particular index, such as a first index, may be returned.

Dramatic change generally refers to a sudden or significant increase or decrease in data (e.g., associated with a metric). In one embodiment, the descriptive insight identifier 230 can analyze a dataset iteratively to identify continuous decreases or increases in a metric value. In identifying a dramatic change, the descriptive insight identifier can identify a drop or climb that results in a maximum or greatest change in data (e.g., associated with a metric). In some cases, each dramatic change may be identified. In other cases, a significant change (e.g. a single most significant change) may be identified. In this regard, in one embodiment, the difference between the highest and lowest value for the given period can be determined, and if the dramatic change is equal to or smaller than a certain percentage (change ratio, C) of that difference, it is considered significant. Stated differently, for a given dataset, $D_s$ where $d_{a \in [1,n]} = \{t_a, v_a\}$, consists of a time unit, $t_a$, and a metric value, $v_a$, a range of index is identified, [i, j] where $1 <= i < j <= n$ and $v_i > v_{i+1} > v_{i+2} \ldots > v_j$ or $v_i < v_{i+1} < v_{i+2} \ldots < v_j$, and $|v_j - v_i| <= (\max(v_1, \ldots v_n) - (v_1, \ldots v_n))*C/100$.

For each type of data identified, the descriptive insight identifier 230 can generate a candidate insight that describes the data. For example, in embodiments, a template of text can be selected that adds text surrounding the identified data to generate a candidate descriptive insight. For example, a template of text may be identified that can describe a cyclic pattern.

The predictive insight identifier 232 is generally configured to identify candidate predictive insights. Predictive insights generally refer to predicted or forecasted data. In this regard, based on current trends, the predictive insight identifier 232 can identify probable facts or data associated with future events. One example of a predictive insight identifier 232 that may be generated is "The revenue will be continuously decreasing in 7 days. By this time the lowest revenue can be 339.11." Generally, the predictive insight identifier 232 analyzes previous data to identify a current pattern and based on this pattern, forecast modeling is performed to identify what is expected to occur in the future (e.g., next few days, etc.)

In some embodiments, to predict data, a model, $M_r$, is generated based on regression analysis. In one embodiment, such a model is trained on a dataset, $D_f=[d_1, d_2, \ldots, d_m]$ (e.g., an entire dataset uploaded or identified by a user) to capture seasonality and trends. In this example, each $d_{a \in [1,m]} = \{ta, va\}$ consists of a time unit, $t_a$, and a metric unit, $v_a$. In this way, the model is represented as $M_r$=RegressionAnalysis ($D_f$). Such a model can predict outcomes for a future time unit(s) (e.g., hours, days, weeks, etc.). For instance, assume the predictive insight identifier 232 intends to forecast next 1 time units. As can be appreciated, the predictive insight identifier 232 may determine such a forecasting based on user input, historical data (e.g., types of data desired to be viewed the user or sets of users), etc. In such a case, the model predicts the output on time $t_o = \{t_{m+1}, t_{m+2}, \ldots, t_{m+l}\}$, wherein the predicted output $v_o = M_r(t_o)$ is a set of predicted metric units, where $v_o = \{v_{m+1}, v_{m+2}, \ldots, v_{m+l}\}$. In some embodiments, types of descriptive data (e.g., cyclic patterns, extremum data, dramatic changes, etc.) associated with the forecasted data may be determined, for example, from $d_o = \{t_o, v_o\}$.

For each type of data identified, the predictive insight identifier 232 can generate a candidate insight that describes the data. For example, in embodiments, a template of text can be selected that adds text surrounding the identified data to generate a candidate predictive insight. For example, a template of text may be identified that can describe forecasted data.

The investigative insight identifier 234 is generally configured to identify candidate investigative insights. Investigative insights generally refer to insights that explain the reasons an event(s) occurs. Stated differently, investigation insights provide contribute analysis indicating a likely cause of an event. An event may refer to a dramatic change, a data anomaly, change of data, or any other aspect of data for which an explanation may be helpful or desired. As one example, an investigative insight may include or indicate a reason behind any dramatic change that occurred. For instance, assume a descriptive insight is generated as follows: "In Georgia, revenue decreased significantly from 2021 Apr. 29 to 2021 May 3 as compared to what was expected." In this example insight, there has been a sudden decrease in total revenue recently so a reason to potentially explain this drop may be useful or desired by a user. As such, the investigative insight identifier 234 may determine that this drop is primarily due to the poor performance in a geographical location (e.g., a state). Providing such an investigative insight to a user can enable the user to take an appropriate action to overcome this drop in revenue.

In embodiments, the investigative insight identifier 234 analyzes data to identify investigative insights. In some cases, the data analyzed may be data used to generate a data visualization (e.g., indicated via a dataset attribute). In other cases, the data analyzed may include data additional or alternative to data used to generate the data visualization. For example, although a user may select to use a particular metric for generating a data visualization or insight, data associated with another metric may be used to identify investigative insight. As a particular example, assume a user selected revenue as a metric of interest. In accordance with a drop in revenue, the investigative insight identifier 234 can analyze other metrics, such a consumer location, to understand the change in revenue.

In one implementation, to generate investigative insights, the investigative insight identifier 234 can use a dimension selected by the user. For example, continuing with the previous example, assume the user selected 'location' as a dimension for analysis. As such, investigative insights can be generated based on analysis of 'location.' As can be appreciated, a user can select any number of dimensions for generating insights. For instance, assume a user selects $[dm_1, dm_2, \ldots, dm_z]$ dimensions to explore the metric v on time frame tm. In such a case, the investigative insight identifier 234 can filter the data (Ds) based on each dimension (dm), the time range (tm=$\{t_1, t_2, \ldots t_w\}$) and then apply regression analysis on the filtered data ($D_r = [t_m, v_a]$) to calculate the expected metric value ($v_e$). Here, $v_a = \{va_1, va_2, \ldots va_w\}$ is the set of original values and $v_e = \{v_{e1}, v_{e2}, \ldots v_{ew}\}$ is the set of expected metric values. In some cases, a subsequent analysis may be performed to identify a dramatic change(s) from the original values. Any such dramatic change can be compared with expected values in the time slot when they are detected. If there is a significant deviation between the actual value and the predicted value, the investigative insight identifier 234 identifies this difference and generates an investigative insight.

As described, although some examples base investigative insight identification on a dimension(s) selected by a user, a user-selected dimension(s) is not necessary. For example, the investigative insight identifier 234 can apply correlation analysis to a metric with available dimensions to identify a most suitable(s) dimension to explore. In accordance with identifying a particular dimension or set of dimensions, the investigative insight identifier can then generate an investigative insight in association with such a dimension(s) (e.g., using implementations described herein).

For each type of data identified, the investigative insight identifier 234 can generate a candidate insight that describes the data. For example, in embodiments, a template of text can be selected that adds text surrounding the identified data to generate a candidate investigative insight. For example, a template of text may be identified that can provide context to an identified contributor of an event.

The prescriptive insight identifier 236 is generally configured to generate candidate prescriptive insights. A candidate prescriptive insight generally indicates or suggests a possible action to take in response to a particular event. One example of a prescriptive insight is as follows: "You can consider a better marketing plan for Watch in Georgia. Revenue for Watch in Georgia is continuously decreasing." In some embodiments, the prescriptive insight identifier 236 identifies prescriptive insights based on a dimension(s) (e.g., selected by a user). Alternatively or additionally, the prescriptive insight identifier 236 identifies prescriptive insights based on dimensions separate from a user-selected dimension. In some cases, the prescriptive insight identifier 236 identifies a most contributing dimension to an event(s) using regression analysis. For example, assume that historical business data contains the "action" record (e.g., offer a discount, arrange product campaigning, etc.). In such a case, the prescriptive insight identifier 236 can identify similar business event(s) (e.g., fall in revenue) and identify the "action" that improved the similar business event(s). In this regard, previous interactions, for example, taken by a user or set of users, can indicate an action to use as a prescriptive insight.

For each type of data identified, the prescriptive insight identifier 236 can generate a candidate insight that describes the data. For example, in embodiments, a template of text can be selected that adds text surrounding the identified data to generate a candidate prescriptive insight. For example, a template of text may be identified that can provide context to an identified action to take in association with an occurrence of an event.

As described, the candidate insight generator 220 can use any such insight identifier, such as descriptive insight identifier 230, predictive insight identifier 232, investigative insight identifier 234, and/or prescriptive insight identifier 236 to identify any number or type of candidate insights. Additional or alternative insight generators are also contemplated in accordance with embodiments of the present technology. Further, a particular type(s) of insight identified may be based on any input (e.g., user selections of attributes), based on default configured insights, automatically determined from previous interactions, etc.

In embodiments, each of the insight identifiers, or other component, may generate a candidate insight by incorporating identified data in association with additional context, for instance to form a textual insight in a natural language form. To do so, a text template may be referenced and used to insert identified data into the placeholders of the text template. For example, assume a template is "The period from _____ to _____ had the greatest revenue of _____." Further assume that the descriptive insight identifier 230 identifies a period of January 1 to February 1 as having the greatest revenue of $10 million. In such a case, the descriptive insight identifier 230, or other component, may identify and/or reference the appropriate template and insert the identified into the template to generate the candidate insight of "The period from January 1 to February 1 had the greatest revenue of $10 million."

In accordance with generating candidate insights via candidate insight generator 220, the insights may be enhanced in either textual form and/or visual form. In embodiments, the insight enhancer 222 is generally configured to enhance insights. The insight enhancer 222 may enhance insights in a textual manner, via text enhancer 240, and/or in a visually depicted manner, via visual enhancer 242.

The text enhancer 240 is generally configured to enhance insights in a textual manner. In this regard, insights generated in the form of text can be enhanced via the text enhancer 240. As described, in some embodiments, the insight identifiers, such as 230-236, may generate textual insights using a template-based approach. In this regard, based on the type of insight identified, a template may be selected to insert the identified data into context or text that describes the insight in a natural language to the user. However, as described, such use of templates to generate the insight can be repetitive in presentation and produce little value to communicate insights. Accordingly, to make insights more unique and useful, in one embodiment, the text enhancer 240 generates enhanced insights in textual formats.

As one example, the text enhancer 240 may generate text insights in different text styles from a given template-based insight. Generally, a different text style is generated to provide different text surrounding the identified data, but also maintaining the desired set of information to convey to a user. For example, for an insight of "The period from January 1 to February 1 had the greatest revenue of $10 million," the text enhancer 240 may generate one or more alternative text styles that convey the same information, such as "The highest revenue of $10 million was generated between January $1^{st}$ through February $1^{st}$." Different text styles can be vary and not intended to be limited herein. Examples of text styles refer to the formality of the text, the conciseness of the text, etc.

In one implementation, the text enhancer 240 uses a style-transfer technique to generate a different text style(s) for a textual insight. In one embodiment, a counterfactual style-transfer technique may be used to generate a different text style(s) for a textual insight. Generally, counterfactuals are used for gradually changing the style representation along a target-style axis. A counterfactual explanation of an outcome Y takes the form 'if X had not occurred, Y would not have occurred.' As described herein, such a counterfactual style-transfer technique can utilize a disentangled style latent representation to generate different text styles for a textual insight.

Accordingly, to use a disentangled style latent representation, embodiments described herein can generate disentangled style representations for a text input. A text input may be a text insight, for example, generated via the candidate insight generator 220, or a portion thereof. For instance, a text insight may include a text template filled in with data identified via an insight identifier.

In embodiments, to generate disentangled style and content representations for a text input, a variational autoencoder (VAE) may be used. VAE is a deep generative model that uses an autoencoder architecture. In embodiments, a VAE with an encoder-decoder is used to encode a text insight, or sentence x, into a latent distribution $H=q_E(h|x)$. In this regard, a text input, such as a sentence representing a text insight, can be input to the VAE, which disentangles the style and content to generate style and content representations. The content representation refers to a representation of the content or static data determined via an insight identifier (e.g., a data point). The style representation refers to a representation of the context or template data that surrounds the static data. For example, as described, the initial template text, without the data identified via the insight identifier(s), can be represented via the style representation. As described, such style representations can be in the form of a latent representation or distribution.

To train the generative model, VAE, to generate disentangled style and content representations, a loss function may be used. One example of a loss function used to train such a generative model is:

$$J_{VAE}(\theta_E, \theta_D) = J_{REC} + \lambda(kl) KL[q_E(h|x) \| p(h)]$$

where $\theta_E$ and $\theta_D$ represent the encoder and decoder parameters, respectively. The first term ($J_{REC}$) encourages reconstruction, while the second term $((\ )[q_E(h|x)\|p(h)])$ regularizes the latent space to a prior distribution (h) (N (0, 1). In addition, multi-task ($J_{mu}(s)$, $J_{mul}(c)$) and adversarial losses (J(adv) (s), $J_{adv}(c)$) are imposed on the latent space h into representing content c and style s, (i.e., h=[s; c], where [;] denotes concatenation). Such losses ensure that the style and content information are present in, and only in their respective style(s) and content(c) embeddings. Training data used to train the generative model may include any type of training data, such as training data representing various types of styles. For example, training data associated with formal text may be labeled as such, and training data associated with casual text may be labeled as such.

In accordance with generating a disentangled style latent representation and content latent representation, the style representation and/or content representation can be provided as input to a counterfactual reasoning module to generate a different text style(s) (s') for a textual insight. In embodiments, the disentangled style representation can be used to generate alternative style representations (e.g., via a style generator) that vary the style. In some cases, counterfactuals are used for gradually changing the style representation along the target-style axis, thereby creating varying instances of style embeddings s.

The counterfactual reasoning module may include a classifier, such as a multi-layer perceptron (MLP) classifier. The style embedding(s) s can be input to the MLP classifier to obtain different text style(s) s' and corresponding confidence levels associated with a text style. That is, the MLP classifier provides a confidence level or probability of how close a generated style embedding s' is to a target style. Advantageously, using a MLP classifier enables random text styles to be generated such that the output sentences to present to the user can vary in language from one instance to the next instance.

In embodiments, a MLP classifier is trained on the disentangled style latent representations learnt by the VAE, such that every instance of style embedding s, predicts a target style (T) of a sentence. Generally, the MLP classifier is used to find s' such that it is close to s in the latent space but leads to a different prediction T', i.e. the target class. To train the MLP classifier to generate different styles s', a loss function may be used. One example of a loss function used to train such a MLP classifier is:

$$J_{cf\ actual}=(s'|S)=((s')-p_t)^2+L_1(s',s)$$

where t is the desired target style class for s', $p_t$ is the probability with which we want to predict this target class (perfect transfer would mean $p_t$=1), $f_t$ is the model prediction on class t, and $L_1$ is the distance between s' and s. The first term in the loss guides towards finding a s' that changes the model prediction to the target class, and use of the $L_1$ distance that minimum number of features are changed in order to change the prediction. λ is the weighting term.

The counterfactual generator is generalizable across different stylistic attributes. To generate multiple variants for a target style, counterfactuals are generated varying the probability of target specific generation (or confidence), $p_t$. This results in different sentence variants with a similar target style but varied degree for transfer strength. The disentangled representations enable finer control over the style dimensions with no risk of content loss during the counterfactual reasoning stage (as the content representations are retained).

As can be appreciated, various counterfactual generator models may be trained and used in association with different types of styles. For example, one or more counterfactual generator models may be trained and used in association with a formality text style, and another one or more counterfactual generator models may be trained and used in association with a conciseness text style.

In accordance with generating different text styles s', the different text styles s' can be aggregated or combined with the content, or the facts. Such aggregation may be accomplished using an encoder-decoder implementation. As such, the output sentences include the content with the different text style variations and corresponding confidence levels or scores.

Advantageously, in embodiments, a user may specify a type of style desired for viewing text (e.g., via an annotation attribute). For example, a user may input, via a graphical user interface, an extent of formality of the text, an extent of conciseness of the text, or various other style types. Such an extent can be binary, scalable, etc. Based on a user-selected style type, a particular sentence or set of text may be selected for presenting to the user. For example, assume a user prefers to view formal text. In such a case, a sentence associated with a highest confidence of having formal text can be selected to present to the user. Although one example provides a user-selected or user-input annotation attribute indicating a user preference for text annotations, or text insights, in embodiments, such annotation attributes may be determined. For example, based on analysis of previous user interactions with data (e.g., the specific user viewing the data, or a set of users, such as global users or users associated with a same organization, etc.), a text annotation attribute can be determined.

Figure 4:
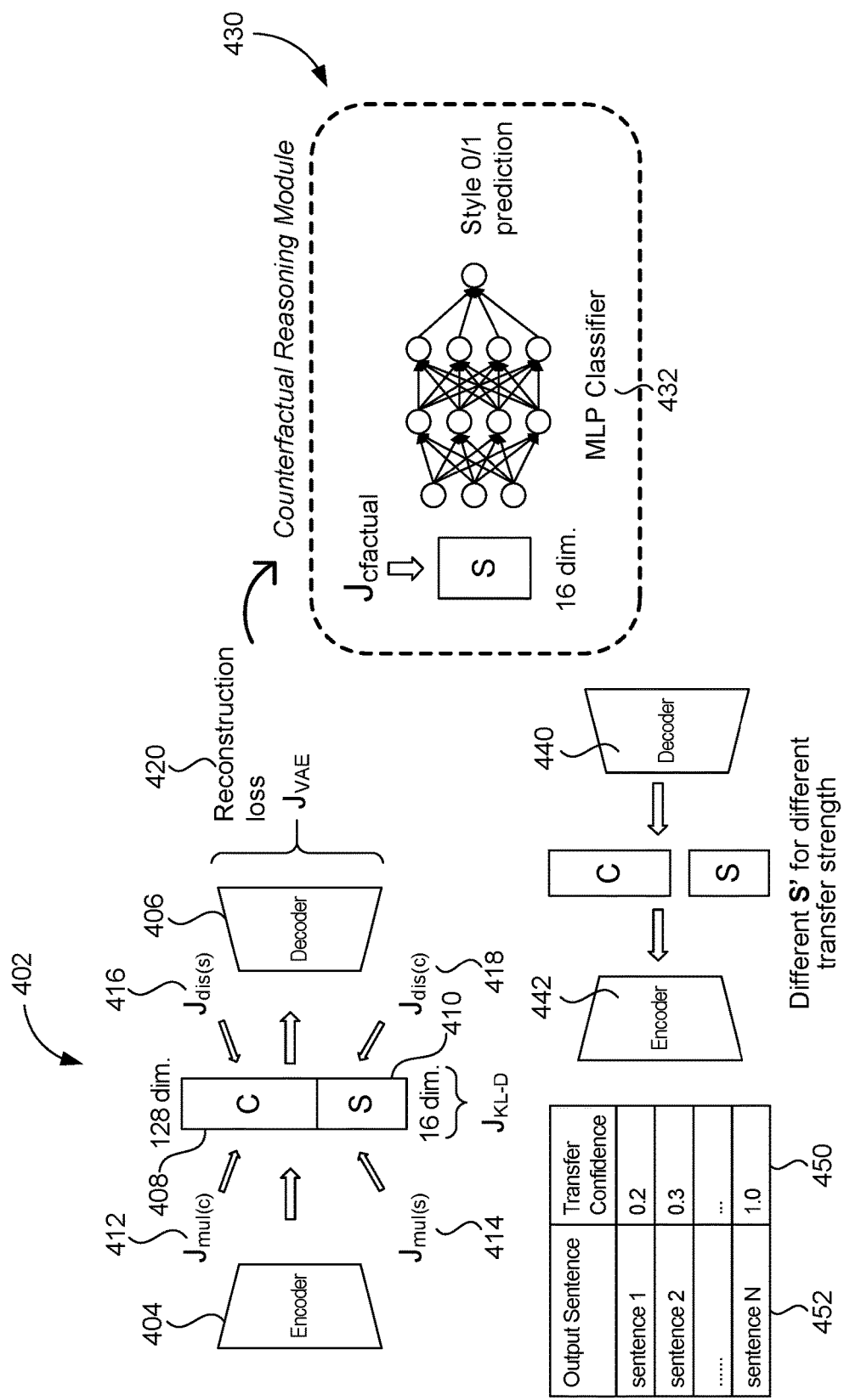
FIG. 4 provides an example approach for style transfer, in accordance with aspects of the technology described herein.

With reference to FIG. 4, FIG. 4 provides one example approach using a counterfactual reasoning module for style transfer. In this approach, VAE 402 includes an encoder 404 and a decoder 406 used to encode a sentence into a latent distribution. As shown, the input sentence is disentangled into a content component 408 and a style component 410. During training, loss functions 412, 414, 416, 418, and 420 are used to train the model. The reconstruction loss function 420 encourages reconstruction while regularizing the latent space to a prior distribution. The style component 410 is generally in the form of a latent representation embedding, and is provided as input to the counterfactual reasoning module 430. The counterfactual reasoning module is generally configured to generate different styles (s') for the input style s. As shown, a MLP classifier 432 can be used to facilitate generation of different styles for an input style. In accordance with generating different styles, the counterfactual reasoning module can also output a confidence or probability associated with the unique style indicating an extent of confidence the unique style, s', corresponds with a target style. Thereafter, encoder 440 and decoder 442 can then be used to combine or integrate each of the unique styles generated via the counterfactual reasoning module with the appropriate content, thereby generating output text, for example, in the form of sentences. Such output text (e.g., sentences) and corresponding confidences can then be provided and/or used to enhance insights. For example, assume a transfer confidence of 1, as indicated at 450, indicates formal text. Further assume that a user input an annotation attribute indicating a preference for formal text style. In such a case, the candidate text style previously generated can be updated or modified to sentence N 452 for presentation to the user. As can be appreciated, sentence N maintains the factual or static data needed to convey to the user, but varies the context or text surrounding the factual data to ensure the text is in the desired formal style.

Returning to FIG. 2, the visual enhancer 242 is generally configured to enhance insights in a visual manner. In this regard, the visual enhancer 242 can generate visual annotations that reflect the ideas the insights convey. As such, identified insights can be enhanced via the visual enhancer 242. In some cases, the visual enhancer 242 may provide visual annotations over the data visualization. In other cases, the visual enhancer 242 may provide visual annotations over a graphical insight presented separately from the data visualization. Such a graphical insight may be a replica of the data visualization with the appropriate visual annotations or a new or different graphical depiction.

In one embodiment, for each insight, $x \in X=[x_1, x_2, \ldots x_m]$, the visual enhancer 242 generates a set of annotation features, $u \in F_v$ where $F_v$ represents the set of features required to render the visualization. In embodiments, different algorithms can apply to different insight types. For example, one approach may be used for one type of insight, while another approach may be used for another type of insight.

As one example, to annotate the dramatic change in descriptive insights, the starting point and ending point of the event can be visually marked (e.g., using a point marker). Further, a separate color can be used for the line that corresponds to that event. As such, this approach can identify the 'starttime-unit', 'end-time-unit', and their corresponding metric values and, thereafter, convert them into point markers defining x-axis (time-unit) and y-axis (metric value). Moreover, to use the separate color for showing a change in the line, the algorithm adds an extra attribute to separate the data points. As another example, to annotate extremum data in visualizations, a temporal value at which an event took place can be identified. This sets the x-axis value, and the corresponding extreme value will be considered as the y-axis value to annotate the event by a point marker.

As described, the textual enhancer 240 and the visual enhancer 242 can use user-specified annotation attributes to generate insights in accordance with user preferences. Additionally or alternatively, other data or other determined annotation attributes may be used to determine presentation of insights. For example, previous user interactions may be monitored to understand or infer preferences of a user. As another example, a user's business role or business communication history may be used to personalize insights and annotations. Various implementations are contemplated. For instance, such identified preferences can be used to change the color of an annotation (e.g., textual or visual), the type of annotation (e.g., showing error bar or not, change point marker to line marker, etc.), change tone of text or narrative (e.g., formal, casual, aggressive, persuasive, concise, etc.).

In some embodiments, each candidate insight may be enhanced via the textual enhancer 240 and/or visual enhancer 242. In other embodiments, a selected candidate insight(s) may be textually or visually enhanced. For example, candidate insights of a particular insight type may be selected for enhancement. As another example, candidate insights more likely desired by a user may be selected for enhancement.

Upon identifying an insight(s) associated with a particular data visualization for providing, the data insight provider 224 may provide insights, for example, in textual or visually depicted form. This can occur in any number of ways. As one example, an insight, or indication thereof, may be provided to a data analysis service (e.g., third-party service) that can generate or render the data insight and/or visualization (e.g., via a server and/or user device). In some cases, the data insight provider 224 may determine or identify the particular information needed to be communicated for generation or rendering of the data visualization. In other cases, the data insight provider 224 may provide the source code to its compatible renderer (e.g., data analysis service) to generate its graphical representation (i.e., scalable vector graphics (SVGs) or Canvas) and the graphics can be displayed in a browser or application on the user device. In yet other cases, the data insight provider 224 may provide to another device for presentation to the user. For instance, the data insight provider 224 may provide the data insight along with a data visualization directly to the user device (e.g., operating a data analysis service thereon) that input the request to view the data visualization and/or data insight. In another example, the data visualization provider 224 may provide the data insight and/or visualization to another component or service (e.g. data analysis service) that provides the data insight and/or visualization to the user device.

Figure 5A:
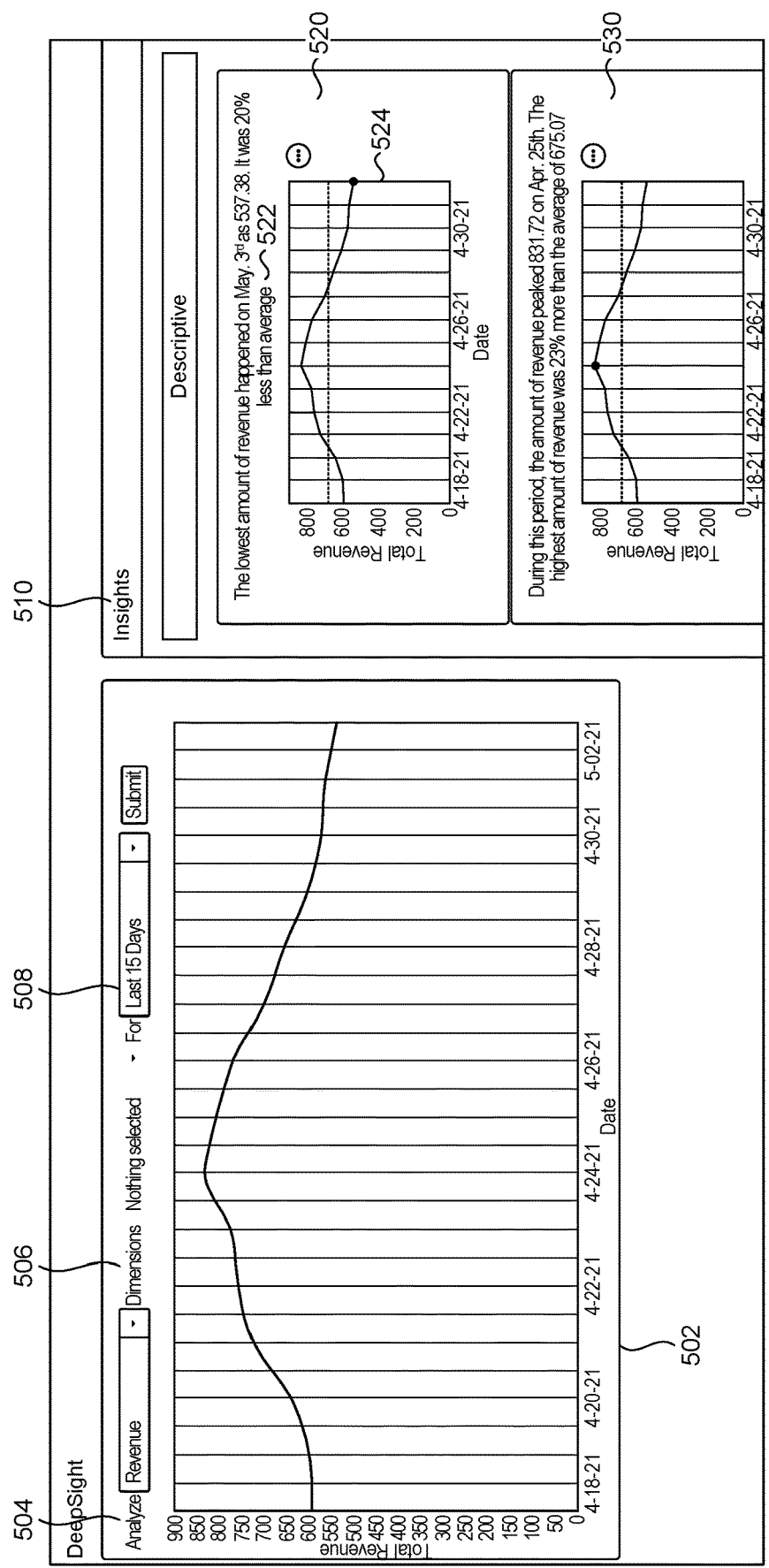

Turning to FIGS. 5A-5F, FIGS. 5A-5F provide various examples of insights presented via a graphical user interface. As shown in FIG. 5A, a data visualization 502 is presented. In accordance with some embodiments, the data used to generate the data visualization 502 may be, at least in part, selected or specified by a user. For example, a user may select a type of data to analyze 504, a dimension of the data 506, and a time frame 508 for the data. Based on the specified dataset attributes, the data visualization 502 is generated.

In accordance with embodiments described herein, various insights can be generated and presented in association with the data visualization. As illustrated, in one implementation, a set of insights may be presented in an insight panel 510 presented concurrently with and adjacent to the data visualization 502. In some cases, the insights may be presented in some sorted order. For example, in some cases, the insights may be presented based on an importance score determined when the insight is generated, or a ranking of the insights. Additionally or alternatively, the insights may be presented in an order based on a type of the insights. For instance, descriptive insights may be presented at a more prominent location (e.g., top) and predictive insights presented at a next most prominent location, etc.

In FIG. 5A, descriptive insights 520 and 530 are initially presented at the top of the insights panel 502. As shown, descriptive insights 520 and 530 both include an insight presented in a text form and a visual form. For example, with descriptive insight 520, the insight is presented in text form 522 stating "The lowest amount of revenue happened on May $3^{rd}$ as 537.38. It was 20% less than average." The descriptive insight is also presented as a visual depiction 524 with the lowest amount visually illustrated at point 526. As described herein, the text form 522 may be an enhanced version of text initially generated via a text template. For example, upon identifying the date of "May $3^{rd}$" and the amount of "537.38," an initial template may be obtained to add the additional text around the date and amount. Using a machine learning model, a set of different text styles may be generated. A text style may be selected for presentation based on a style preference of the user. For example, assume a user desires a more formal writing style. In such a case, a text style that aligns with a more formal writing style may be selected and presented to the user. In this example, a user may scroll through the insight panel 510 to view additional insights. In other embodiments, each of the insights may presented via an insight panel 510, for example, in reduced size to appear on the initial screen.

FIGS. 5B-5F provide other example insights that may be presented via a graphical user interface. FIGS. 5B and 5C provide additional descriptive insights 540 and 550, respectively. Descriptive insight 540 corresponds with an identified significant event, that is a dramatic change. In addition to textually and visually describing the dramatic change, embodiments described herein can recognize that additional insights may be generated in association with this descriptive insight. For instance, a related predictive insight, investigative insight, and prescriptive insight may have also been generated in relation to this dramatic change. In some cases, such insights may be automatically presented. In other cases, and as shown in FIG. 5B, the additional insights may be accessed or viewed based on a user selection to do so. For instance, assume a user is interested in viewing forecasted data. In such a case, the user may select the forecast button 542 to view a predictive insight. As another example, based on an interest to view a rational related to the dramatic change, the user may select the why button 544 to view an investigative insight. As yet another example, based on an interest to view a suggested action to take relative to the dramatic change, the user may select the what to do button 546 to view a prescriptive insight. As can be appreciated, in some cases, the additional insights may already be determined before such button options are presented. In other cases, such additional insights may be determined after receiving a user selecting an interest to view such data.

Figure 5D:
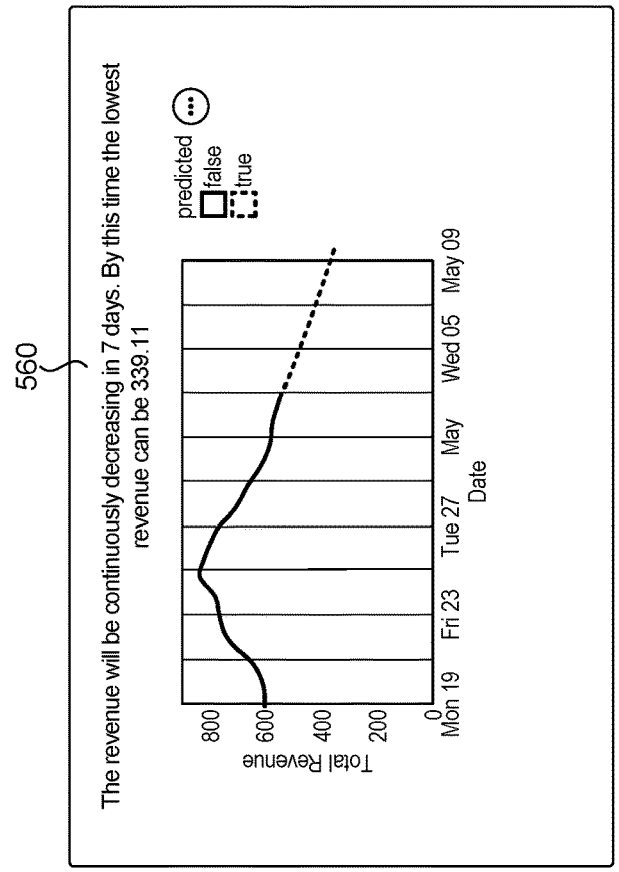
Figure 5E:
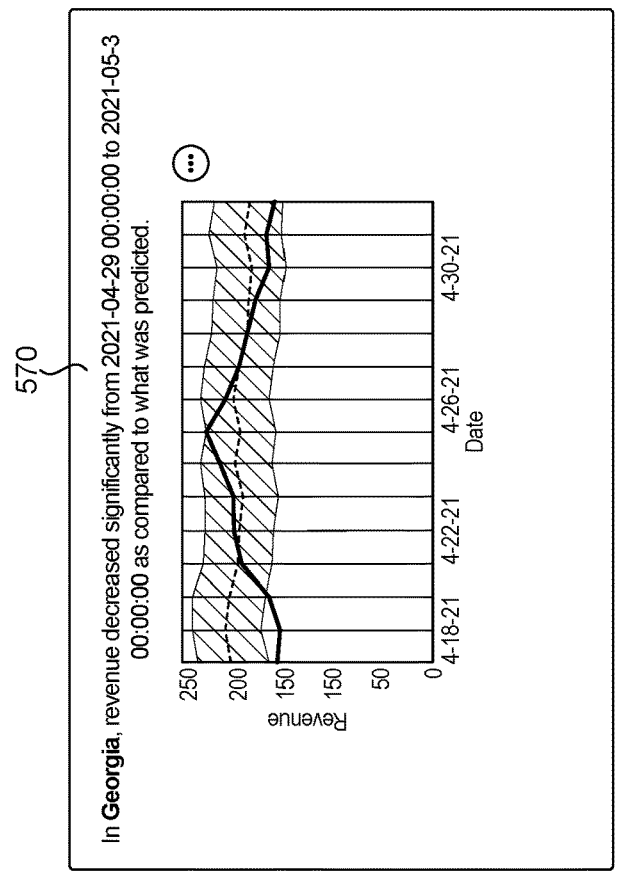
Figure 5F:
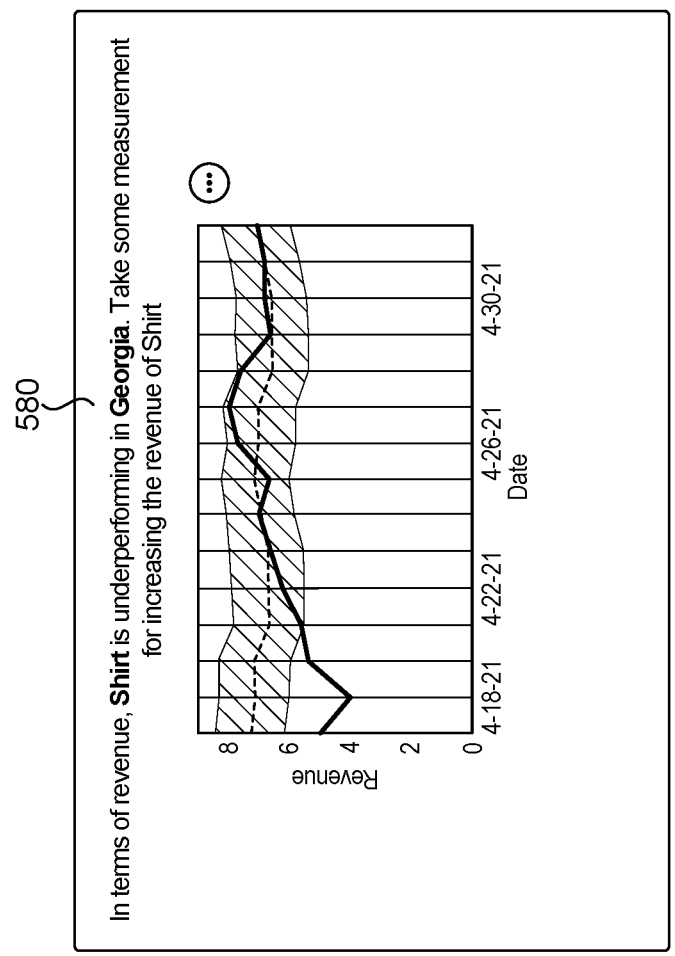

Turning to FIG. 5C, assume a user is interested in viewing forecasted data relative to the continuous drop shown in insight 550. In such a case, the user can select the forecast button 552. Based on selecting the forecast button 552, a predictive insight 560 is presented, as shown in FIG. 5D. A user selecting the why button 554 of FIG. 5C can result in an investigative insight 570 shown in FIG. 5E. A user selecting the what to do button 556 results in a prescriptive insight 580, as shown in FIG. 5F. In embodiments, any number of additional insights may be presented. For example, upon selecting what to do button 556 of FIG. 5C, any number of prescriptive insights may be concurrently or serially presented via a graphical user interface.

Figure 6:
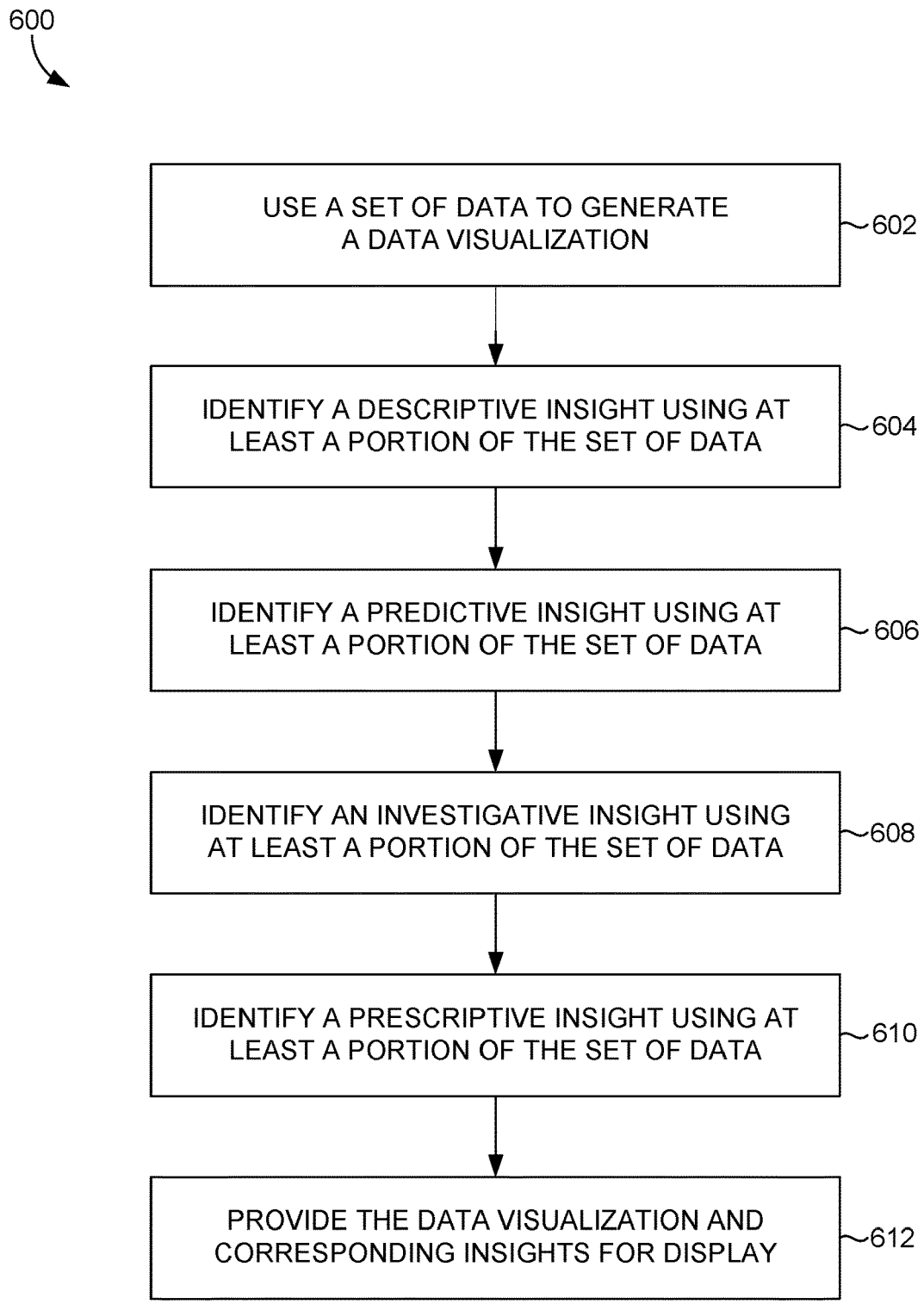
FIG. 6 provides a first example method for facilitating generation and presentation of insights, in accordance with aspects of the technology described herein.
Figure 7:
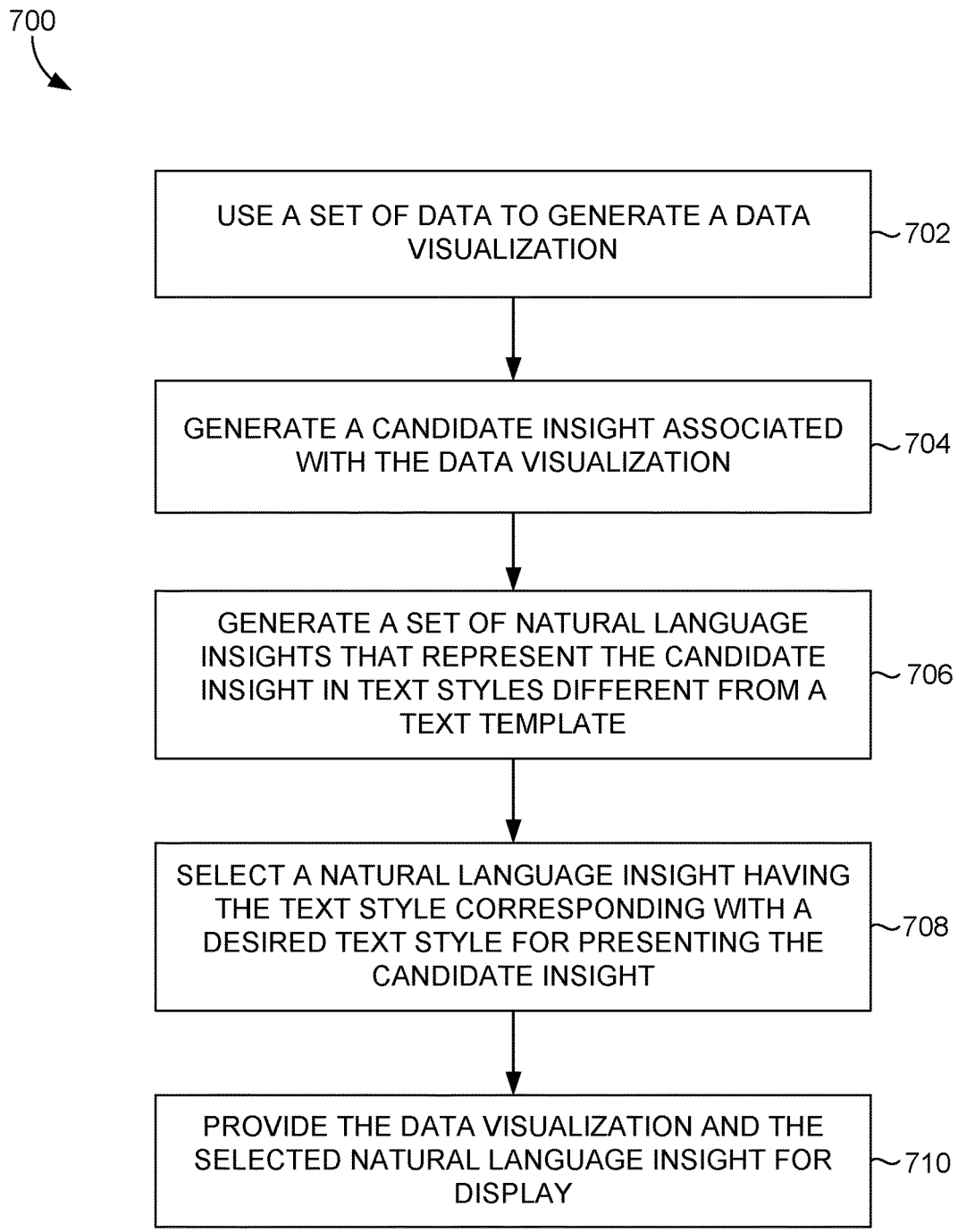
FIG. 7 provides a second example method for facilitating generation and presentation of insights, in accordance with aspects of the technology described herein.
Figure 8:
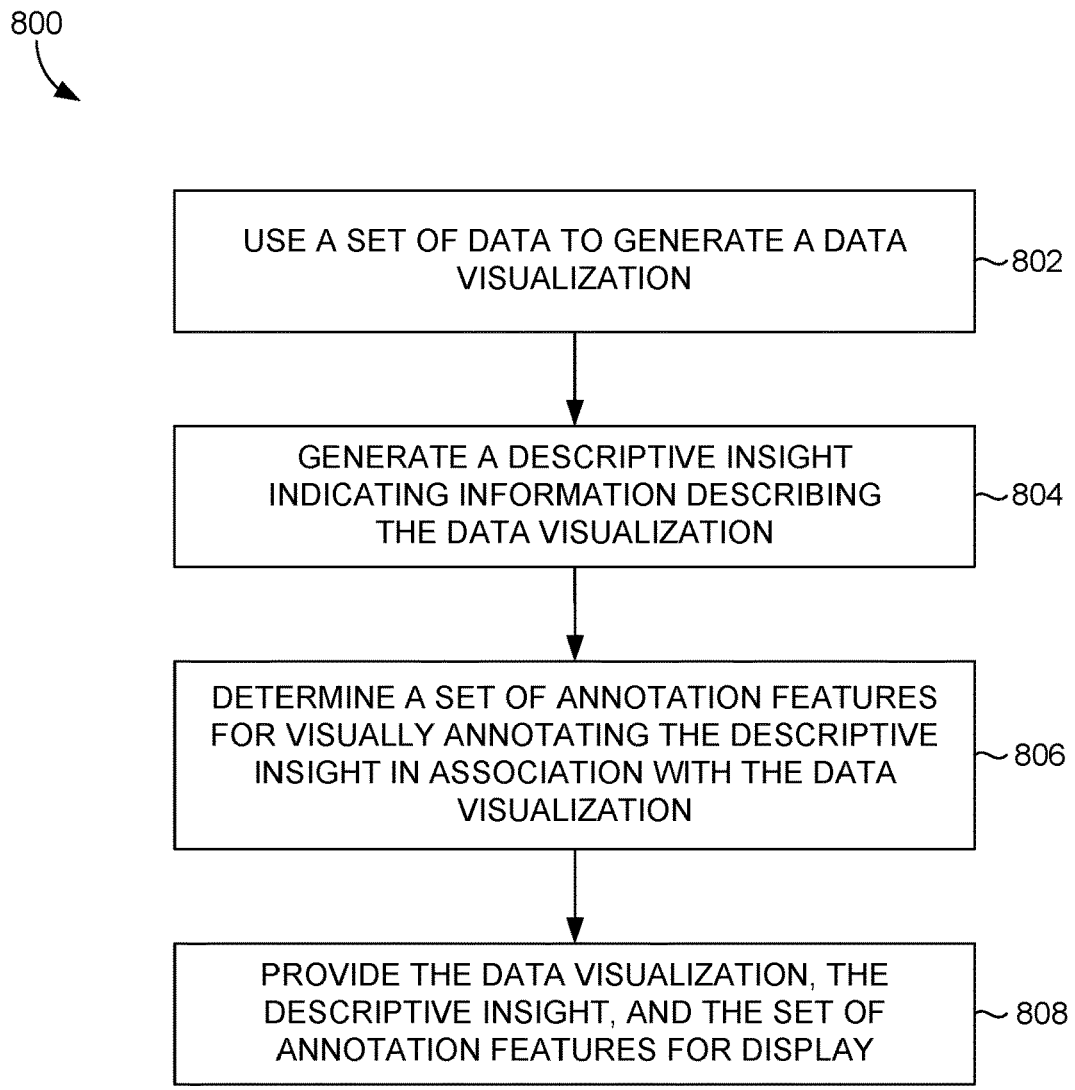
FIG. 8 provides a third example method for facilitating generation and presentation of insights, in accordance with aspects of the technology described herein.

As described, various implementations can be used in accordance with embodiments described herein. FIGS. 6-8 provide methods of facilitating generation and presentation of advanced insights, in accordance with embodiments described herein. The methods 600, 700, and 800 can be performed by a computer device, such as device 900 described below. The flow diagrams represented in FIGS. 6-8 are intended to be exemplary in nature and not limiting.

Turning initially to method 600 of FIG. 6, method 600 is directed to one implementation of facilitating generation and presentation of insights, in accordance with embodiments of the present technology. Initially, at block 602, a set of data is used to generate a data visualization. A set of data may be any set of data, and in some cases, aspects of the data are specified by the user. For instance, a user may specify or select a type of data to analyze, a data range for data analysis, etc. At block 604, a descriptive insight is identified using at least a portion of the set of data. A descriptive insight generally indicates information describing the data visualization. Examples of descriptive insights include a cyclic pattern, an extremum data, or a dramatic change. In some embodiments, a cyclic pattern is identified as a descriptive insight when an auto correlation between a series of data and a delayed copy over a particular window interval is greater than a threshold. A dramatic change is identified as a descriptive insight when a difference between a highest value and a lowest value for a given period is less than a percentage of that difference.

At block 606, a predictive insight is identified using at least a portion of the set of data. A predictive insight generally indicates forecasted data. At block 608, an investigative insight is identified using at least a portion of the set of data. An investigative insight generally indicates a rational for the descriptive insight or the predictive insight. At block 610, a prescriptive insight is identified using at least a portion of the set of data. The prescriptive insight generally indicates a recommended action to perform based on the descriptive insight. At block 612, the data visualization and corresponding insights are provided for display, for example, to a user. In some cases, a set of descriptive insights are initially presented and, based on a user selection, predictive, investigative, and/or prescriptive insights are presented. In some cases, the data visualization is presented within a first panel in the graphical user interface and the insights are presented within a second panel in the graphical user interface.

Turning to FIG. 7, method 700 of FIG. 7 is directed to another example implementation of facilitating generation and presentation of insights, in accordance with embodiments of the present technology. Initially, as indicated at block 702, a set of data is used to generate a data visualization. Such a set of data may be any type or amount of data and, in some cases, is specified by a user. In embodiments, a user may indicate a desired data visualization (e.g., a metric desired to view). At block 704, a candidate insight associated with the data visualization is generated. In embodiments, the candidate insight is generated in text form based on a text template. In this regard, upon identifying specific data, such as statistical data, context or surrounding text from a template can be selected and integrated with the statistical data. At block 706, a set of natural language insights that represent the candidate insight in text styles different from the text template is generated. For example, assume a candidate insight text is in a first text style. In such a case, a set of varied insights are generated in various other text styles, such as a second text style, a third text style, etc. Such generation of varied insight text may be performed via a machine learning model. For instance, counterfactual reasoning may be applied to change the style representation. At block 708, a natural language insight having the text style corresponding with a desired text style is selected for presenting the candidate insight. Such a selection may be based on, for instance, confidence levels output in association with the various natural language insights. The desired text style can be input by a user or automatically determined based on previous user interactions, among other things. At block 710, the data visualization and the selected natural language insight are provided for display. For instance, a user device may obtain the data visualization and selected natural language insight and concurrently present the data via a graphical user interface. In some cases, the data visualization may be presented in one panel and the selected natural language insight may be presented in another panel via the graphical user interface.

With reference now to FIG. 8, method 800 of FIG. 8 is directed to another example implementation of facilitating generation and presentation of advanced insights, in accordance with embodiments of the present technology. At block 802, a set of data is used to generate a data visualization. At block 804, a descriptive insight indicating information describing the data visualization is generated. The descriptive insight is generated in text form using at least a portion of the set of data. At block 806, a set of annotation features for visually annotating the descriptive insight in association with the data visualization is determined. The set of annotation features determined may be based on the type of descriptive insight. For instance, the set of annotation features determined for a dramatic change can be different than the set of annotation features determined for an extremum data. At block 808, the data visualization, the descriptive insight, and the set of annotation features are provided for display. In embodiments, the set of annotation features are used to visually depict the text form of the descriptive insight. As such, a descriptive insight can be presented in both text form and a visual depiction form, thereby providing the viewer with detailed information in various formats.

Having briefly described an overview of aspects of the technology described herein, an exemplary operating environment in which aspects of the technology described herein may be implemented is described below in order to provide a general context for various aspects of the technology described herein.

Figure 9:
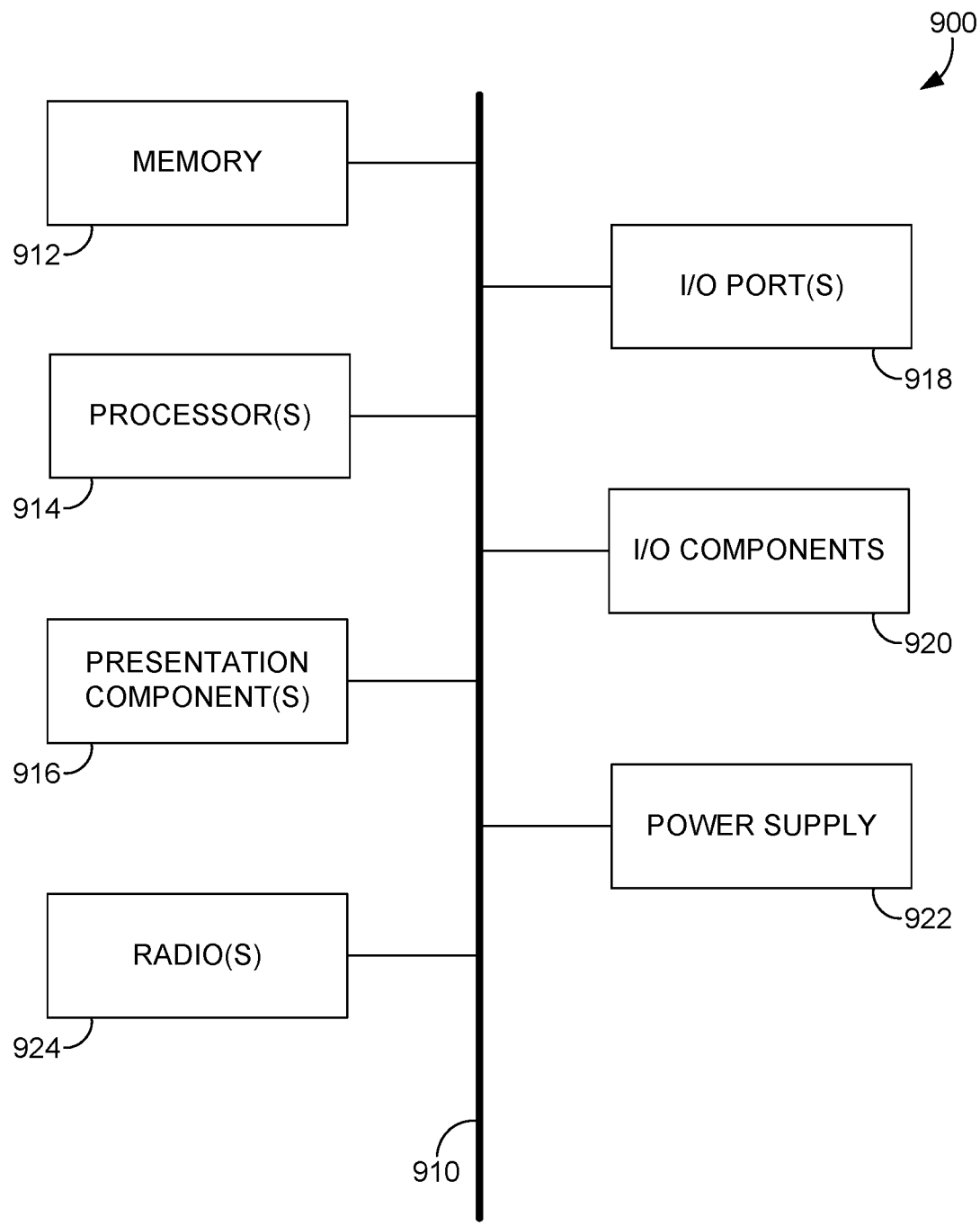
FIG. 9 is a block diagram of an exemplary computing environment suitable for use in implementing aspects of the technology described herein.

Referring to the drawings in general, and initially to FIG. 9 in particular, an exemplary operating environment for implementing aspects of the technology described herein is shown and designated generally as computing device 900. Computing device 900 is just one example of a suitable computing environment and is not intended to suggest any limitation as to the scope of use or functionality of the technology described herein. Neither should the computing device 900 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, an illustrative power supply 922, and a radio(s) 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more aspects of the technology described herein. Distinction is not made between such categories as "workstation," "server," "laptop," and "handheld device," as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, and optical-disc drives. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, and vibrating component. I/O port(s) 918 allow computing device 900 to be logically coupled to other devices including I/O components 920, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 900. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include radio(s) 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A method comprising:
   using a set of data to generate a data visualization;
   generating a candidate insight associated with the data visualization, the candidate insight being generated in text form based on a text template and comprising a descriptive insight, a predictive insight, an investigative insight, or a prescriptive insight;
   generating, via a machine learning model, a set of natural language insights that each represent the candidate insight in a text style that is different from the text template;
   selecting a natural language insight having the text style corresponding with a desired text style for presenting the candidate insight; and
   providing, for display via a graphical user interface, the data visualization and the selected natural language insight.

2. The method of claim 1,
   wherein if the candidate insight comprises the descriptive insight, the descriptive insight indicates information describing the data visualization,
   wherein if the candidate insight comprises the predictive insight, the predictive insight predicts future data points,
   wherein if the candidate insight comprises the investigative insight, the investigative insight indicates a rational for the descriptive insight, and
   wherein if the candidate insight comprises the prescriptive insight, the prescriptive insight indicates a recommended action to perform based on the descriptive insight.

3. The method of claim 1, wherein the desired text style is a user-selected text style input via the graphical user interface or is determined based on previous user interactions.

4. The method of claim 1, further comprising determining a set of annotation features for visually annotating the natural language insight.

5. The method of claim 1, wherein the machine learning model comprises a multilayer perceptron model and uses counterfactual reasoning to generate the set of natural language insights.

6. The method of claim 1, wherein the set of natural language insights are generated by:
   using a first encoder-decoder to encode the candidate insight in text form into a disentangled representation including a content representation and a style representation;
   using the machine learning model, in the form of a counterfactual reasoning module, to generate a set of different style representations based on the style representation; and
   using a second encoder-decoder to generate the set of natural language insights, wherein each of the natural language insights is generated by aggregating a corresponding different style representation with the content representation.

7. The method of claim 1, wherein the natural language insight is selected based on corresponding confidences indicating an extent of similarity of the text style corresponding with the desired text style.

8. A non-transitory computer-readable medium storing executable instructions, which when executed by a processing device, cause the processing device to perform operations comprising:
   using a set of data to generate a data visualization;
   identifying a descriptive insight indicating information describing the data visualization using at least a portion of the set of data;
   identifying an investigative insight indicating a rational for the descriptive insight or a prescriptive insight indicating a recommended action to perform based on the descriptive insight; and
   providing, for display via a graphical user interface, the data visualization, the descriptive insight, and the investigative insight or the prescriptive insight.

9. The non-transitory computer-readable medium of claim 8, wherein the identified investigative insight or the prescriptive insight is presented based on a user selection associated with the descriptive insight.

10. The non-transitory computer-readable medium of claim 8, wherein the descriptive insight comprises a cyclic pattern, an extremum data, or a dramatic change.

11. The non-transitory computer-readable medium of claim 10, wherein the cyclic pattern is identified as a descriptive insight when an auto correlation between a series of data and a delayed copy over a particular window interval is greater than a threshold.

12. The non-transitory computer-readable medium of claim 10, wherein a dramatic change is identified as a descriptive insight when a difference between a highest value and a lowest value for a given period is less than a percentage of that difference.

13. The non-transitory computer-readable medium of claim 8, wherein the data visualization is presented within a first panel in the graphical user interface and the descriptive insight is presented within a second panel in the graphical user interface, and wherein the investigative insight or the prescriptive insight is presented based on a user selection associated with the descriptive insight presented in the second panel in the graphical user interface.

14. The non-transitory computer-readable medium of claim 8, wherein at least one of the descriptive insight, the investigative insight, or the prescriptive insight include a text style selected to correspond to a desired text style for presenting the corresponding insight.

15. The non-transitory computer-readable medium of claim 8, wherein the descriptive insight includes a visual annotation for visually annotating the descriptive insight in association with the data visualization.

16. A system comprising:
   a memory component; and
   a processing device coupled to the memory component, the processing device to perform operations comprising:
      using a set of data to generate a data visualization;
      generating a descriptive insight indicating information describing the data visualization, the descriptive insight being generated in text form using at least a portion of the set of data;
      determining a set of annotation features for visually annotating the descriptive insight in association with the data visualization; and
      providing, for display via a graphical user interface, the data visualization, the descriptive insight, and the set of annotation features, wherein the set of annotation features are used to visually depict the text form of the descriptive insight.

17. The system of claim 16, wherein the set of annotation features used to visually depict the text form of the descriptive insight are presented in a manner that corresponds with an annotation attribute identified based on a user selection or a set of previous user interactions.

18. The system of claim 16, wherein the set of annotation features include a set of one or more points in a graph or a chart to visually emphasize.

19. The system of claim 16, wherein the set of annotation features visually depict the text form of the descriptive insight in a new chart or a new graph presented in association with the descriptive insight.

20. The system of claim 16, wherein the text form of the descriptive insight is a natural language insight generated, via a machine learning model, in a text style different from a text template.

* * * * *